(12) United States Patent
Eakins

(10) Patent No.: US 9,296,479 B1
(45) Date of Patent: Mar. 29, 2016

(54) STOWAGE BIN WITH CLOSING FORCE ASSISTANCE

(71) Applicant: The Boeing Company, Chicago, IL (US)

(72) Inventor: Mark Edward Eakins, Kirkland, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/484,028

(22) Filed: Sep. 11, 2014

(51) Int. Cl.
  *B64D 11/00* (2006.01)
  *G05D 3/00* (2006.01)
  *G05D 15/01* (2006.01)

(52) U.S. Cl.
  CPC ................ *B64D 11/003* (2013.01); *G05D 3/00* (2013.01); *G05D 15/01* (2013.01)

(58) Field of Classification Search
  USPC .......................................................... 701/49
  See application file for complete search history.

(56) References Cited

U.S. PATENT DOCUMENTS

| | | | |
|---|---|---|---|
| 5,244,269 A | 9/1993 | Harriehausen et al. | |
| 6,088,239 A * | 7/2000 | Zeiss .................... | B64D 11/003 244/118.1 |
| 6,691,951 B2 * | 2/2004 | Frazier ................. | B64D 11/003 244/118.1 |
| 6,814,331 B2 * | 11/2004 | Hessling ................. | B64C 1/066 244/119 |
| 7,090,314 B2 * | 8/2006 | Burrows ............... | B64D 11/003 244/118.5 |
| 7,246,771 B2 * | 7/2007 | Wisch .................. | B64D 11/003 244/118.5 |
| 7,481,397 B2 * | 1/2009 | Steinbeck ............. | B64D 11/003 244/118.5 |
| 7,887,008 B2 * | 2/2011 | Lamoree ............... | B64D 11/003 244/118.1 |
| 7,934,678 B2 * | 5/2011 | Wieding ................. | G05G 15/08 244/118.5 |
| 7,937,169 B2 * | 5/2011 | Kneller ................ | B64D 11/003 244/118.1 |
| 8,262,022 B2 | 9/2012 | Young et al. | |
| 8,596,577 B2 * | 12/2013 | Berkenhoff .......... | B64D 11/003 244/118.1 |
| 8,944,375 B2 * | 2/2015 | Merz ..................... | B64D 11/003 244/118.5 |
| 2005/0218264 A1 | 10/2005 | Graf et al. | |
| 2008/0073462 A1 | 3/2008 | Wolf et al. | |
| 2008/0078868 A1 * | 4/2008 | Lamoree ............... | B64D 11/003 244/118.1 |
| 2011/0253714 A1 * | 10/2011 | Ivester ................. | B64D 11/003 220/211 |
| 2011/0266937 A1 | 11/2011 | Roberts et al. | |
| 2013/0119199 A1 * | 5/2013 | Merz ..................... | B64D 11/003 244/118.5 |

FOREIGN PATENT DOCUMENTS

| | | |
|---|---|---|
| EP | 0899192 A2 | 3/1993 |
| WO | WO9518040 A1 | 7/1995 |

OTHER PUBLICATIONS

Extended European Search Report, dated Feb. 9, 2016, regarding Application No. EP15184613.6, 7 pages.

* cited by examiner

*Primary Examiner* — Thomas Tarcza
*Assistant Examiner* — Alex C Dunn
(74) *Attorney, Agent, or Firm* — Yee & Associates, P.C.

(57) ABSTRACT

A method and apparatus for providing a closing force. The apparatus comprises a stowage bin, a number of sensors that measure a number of forces on the stowage bin, an assist mechanism that provides a closing force, a controller that compares data from the number of sensors, and an adjustment mechanism that adjusts the closing force based on the data from the number of sensors. The assist mechanism has a mechanical advantage that changes to provide the closing force.

23 Claims, 16 Drawing Sheets

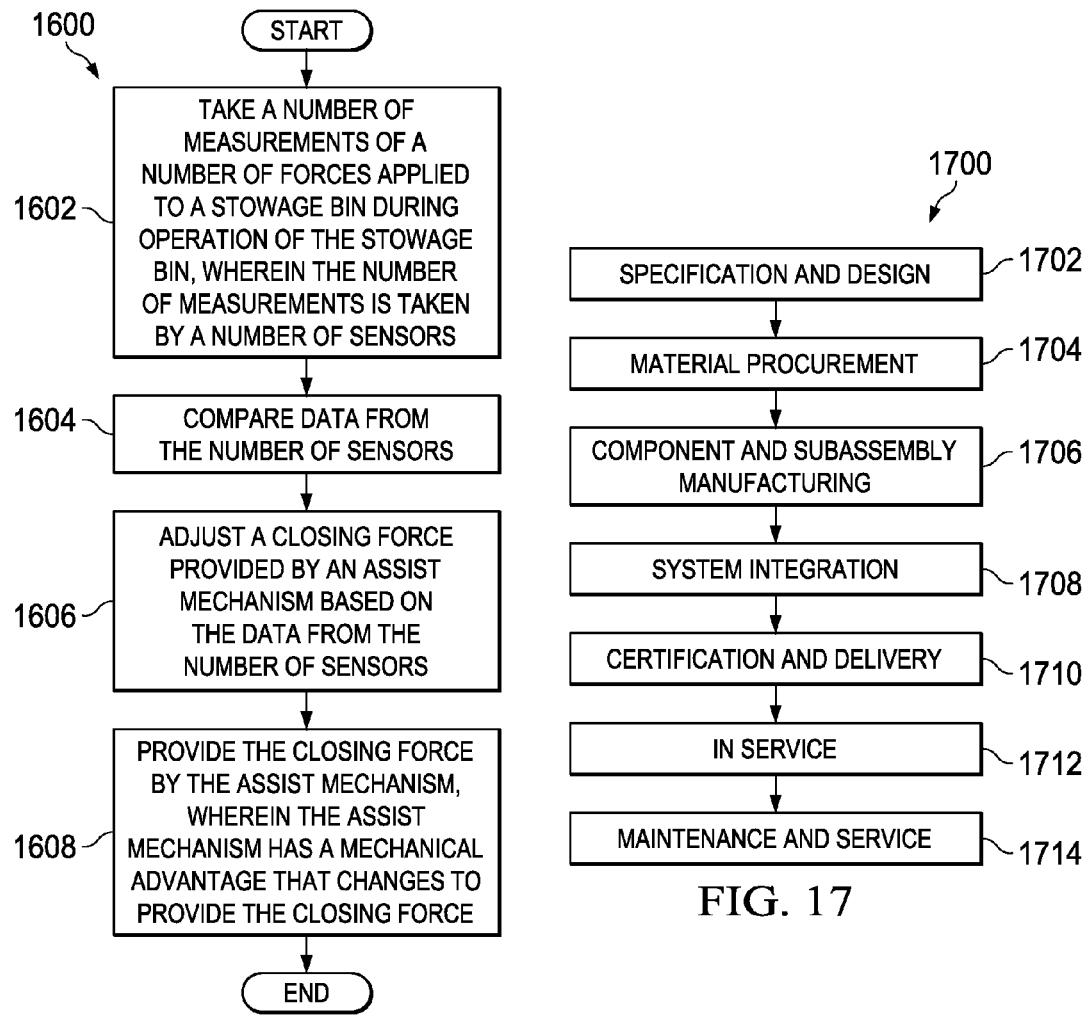
FIG. 16
FIG. 17
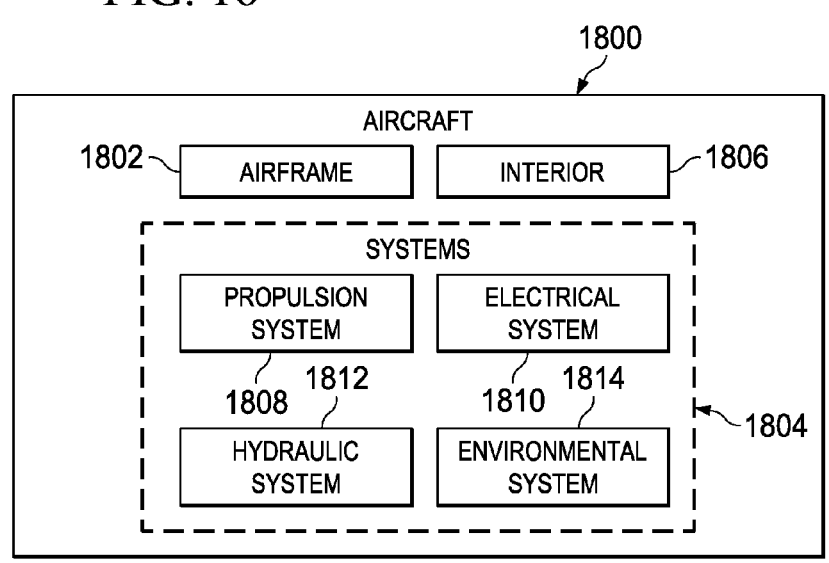
FIG. 18

STOWAGE BIN WITH CLOSING FORCE ASSISTANCE

BACKGROUND INFORMATION

1. Field

The present disclosure relates generally to storage of items, and in particular, to overhead storage of items. Still more particularly, the present disclosure relates to an apparatus for storing items in an overhead stowage bin in an aircraft.

2. Background

In commercial aviation, passengers may bring carry-on luggage into the passenger cabin of the aircraft. This luggage may be stored within the passenger cabin in designated storage areas. Designated storage areas in the passenger cabin include areas on the floor underneath the passenger seats and overhead stowage bins.

A passenger places luggage in the overhead stowage bin when the overhead stowage bin is in an open position. After luggage is placed into an overhead stowage bin, the bin is closed.

Many designs for overhead stowage bins exist. Some overhead stowage bin designs include a stationary luggage bin and a rotating door. Other overhead stowage bin designs include a rotating luggage bin. Still other overhead stowage bin designs feature a luggage bin which is lowered into the passenger cabin.

As commercial airlines continue to charge baggage fees, an increasing number of passengers are bringing carry-on items into the passenger cabin. As a result, larger stowage bins are needed to accommodate the increase in carry-on luggage. Larger bins result in more luggage being placed into each bin, which increases the weight of items in the bin.

Commercial airlines also desire to improve passenger experience by providing more head room above seats in an aircraft. As a result, lowering the stowage bins may be undesirable. Some aircraft are even being designed with overhead stowage bins positioned higher in the passenger cabin than before.

When more luggage is placed into overhead stowage bins, these bins become more difficult to close than desired. Bins oriented higher above the passenger seats compound the problem, resulting in at least one of more force needed to close the stowage bin or greater distance to lift the items in the stowage bin. Therefore, it would be desirable to have a method and apparatus that take into account at least some of the issues discussed above, as well as other possible issues.

SUMMARY

An illustrative embodiment of the present disclosure provides an apparatus. The apparatus comprises a stowage bin, a number of sensors that measure a number of forces on the stowage bin, an assist mechanism that provides a closing force, a controller that compares data from the number of sensors, and an adjustment mechanism that adjusts the closing force based on the data from the number of sensors. The assist mechanism has a mechanical advantage that changes to provide the closing force.

A further illustrative embodiment of the present disclosure provides a method. The method comprises taking a number of measurements of a number of forces applied to a stowage bin during operation of the stowage bin. The number of measurements is taken by a number of sensors. The method also compares data from the number of sensors. The method further adjusts a closing force provided by an assist mechanism based on the data from the number of sensors. The method then provides the closing force by the assist mechanism. The assist mechanism has a mechanical advantage that changes to provide the closing force.

Another illustrative embodiment of the present disclosure provides an apparatus. The apparatus comprises a stowage bin, a pivot directly connected to the stowage bin and a structure such that the stowage bin may rotate about the pivot from an open position to a closed position, and an assist mechanism that provides a closing force. The assist mechanism has a mechanical advantage that changes to provide the closing force.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 16 is an illustration of a flowchart of a process for providing a closing force in accordance with an illustrative embodiment;

FIG. 17 is an illustration of a block diagram of an aircraft manufacturing and service method in accordance with an illustrative embodiment; and FIG. 18 is an illustration of a block diagram of an aircraft in which an illustrative embodiment may be implemented.

DETAILED DESCRIPTION

The illustrative embodiments recognize and take into account a number of different considerations. For example, the illustrative embodiments recognize and take into account that overhead stowage bins are designed with passenger safety, passenger comfort, capacity, and weight in mind. The illustrative embodiments recognize and take into account that the design of a stowage bin may improve the comfort and ease of using the bin. For example, assist mechanisms may be connected to a stowage bin to provide a desirable amount of assistance in closing the bin.

The illustrative embodiments recognize and take into account, however, that some currently used assist mechanisms may not change the amount of closing force assistance in a desirable manner. For instance, some existing systems do not change the amount of assistance based on the weight of luggage in the bin. Changing the amount of assistance provided is desirable such that the bin may be closed easily, regardless of the weight of its contents.

The illustrative embodiments further recognize and take into account that it is desirable to provide closing assistance without adding more weight and complexity to the aircraft than desired. For example, the illustrative embodiments recognize and take into account that implementing components that require power to close the bin may add more weight than desired, increase the cost of the aircraft more than desired, degrade the performance of the aircraft, or a combination thereof.

Thus, the illustrative embodiments provide a method and apparatus for closing a stowage bin. An apparatus comprises an assist system connected to the stowage bin that assists in closing the stowage bin. The assist mechanism has a mechanical advantage that changes to provide a closing force. The closing force may be adjusted based on data from a number of sensors that measure a number of forces on the stowage bin. In some illustrative examples, the closing force may reduce a force required to move the stowage bin between an open position and a closed position.

Figure 1:
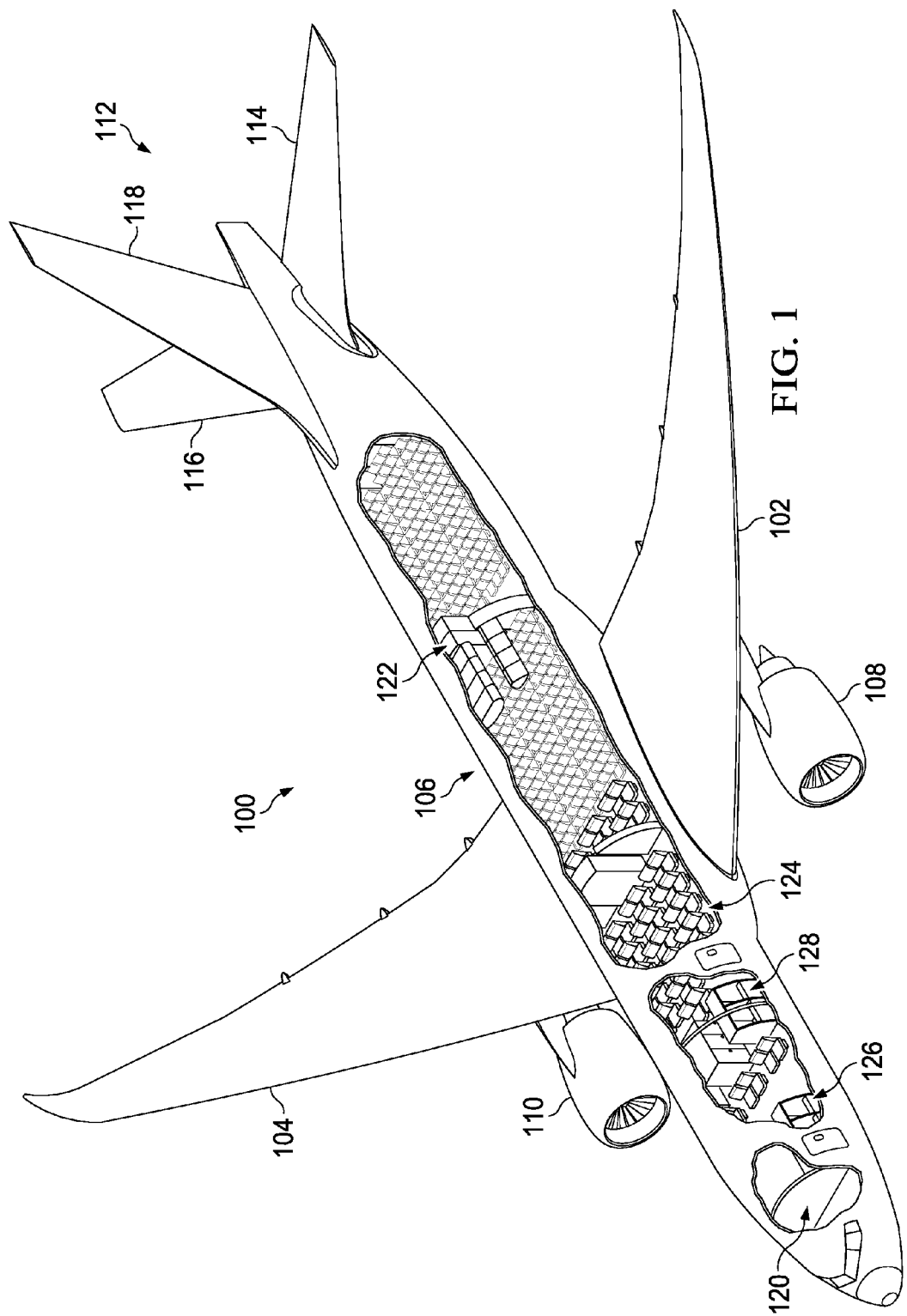
FIG. 1 is an illustration of an aircraft in which an illustrative embodiment may be implemented.

With reference now to the figures, and in particular, with reference to FIG. 1, an illustration of an aircraft is depicted in accordance with an illustrative embodiment. In this illustrative example, aircraft 100 has wing 102 and wing 104 attached to body 106. Body 106 may also be referred to as a fuselage. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Body 106 also has cockpit 120 and passenger cabin 122. In this example, passenger cabin 122 may include passenger seating in seating area 124. Passenger seating may include a number of aircraft seats. As used herein, a "number of" items means one or more items. For example, a number of aircraft seats means one or more aircraft seats.

Further, seating area 124 in passenger cabin 122 may also include storage areas, such as a number of overhead stowage bins. Passenger cabin 122 also may include lavatory 126 and galley area 128. These two areas may be partitioned or separated from seating area 124 by a partitioning structure such as, for example, without limitation, a wall, a partition, a class divider, a lavatory, a galley, a curtain, a stair enclosure, or a bar unit.

This illustration of aircraft 100 is provided for purposes of illustrating one environment in which the different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as private passenger aircraft, a rotorcraft, and other suitable type of aircraft.

Also, other areas may be present in addition to seating area 124, lavatory 126, and galley area 128. Other areas may include, for example, without limitation, closets, storage areas, lounges, and other suitable areas for passenger seating. As another example, airplane seats within seating area 124 may be arranged differently from the depicted example. In other illustrative embodiments, some seats may be grouped into sets of single seats instead of three seats or pairs of seats as is illustrated in seating area 124.

Figure 2:
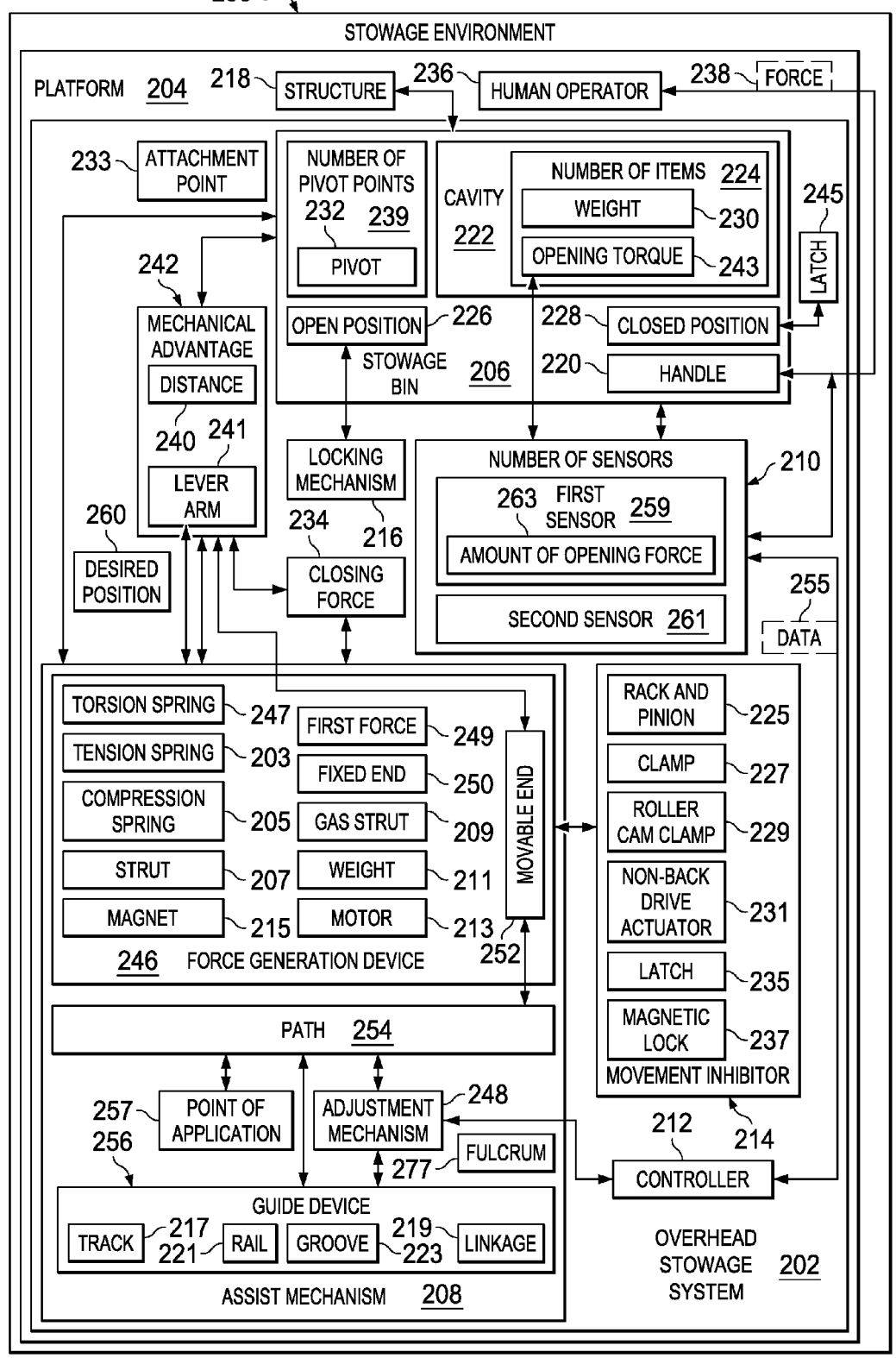
FIG. 2 is an illustration of a block diagram of a stowage environment in accordance with an illustrative embodiment.

Turning next to FIG. 2, an illustration of a block diagram of a stowage environment is depicted in accordance with an illustrative embodiment. Stowage environment 200 is an environment in which overhead stowage system 202 is used in platform 204. Aircraft 100 shown in FIG. 1 is an example of a physical implementation for platform 204 shown in block form in this figure.

As depicted, overhead stowage system 202 includes a number of different components. In this illustrative example, overhead stowage system 202 includes stowage bin 206, assist mechanism 208, number of sensors 210, controller 212, movement inhibitor 214, and locking mechanism 216.

In this depicted example, stowage bin 206 is a structure that holds items in aircraft 100. In particular, stowage bin 206 is an overhead stowage bin. For example, stowage bin 206 may be oriented above passenger seats in seating area 124 in passenger cabin 122 of aircraft 100 shown in FIG. 1.

Stowage bin 206 is connected to structure 218 in platform 204. Structure 218 may take the form of at least one of a structural member, a housing, a frame, a wall, a ceiling, a skin panel, or other suitable structures in platform 204.

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

In an illustrative example, stowage bin 206 has latch 245, handle 220 and cavity 222. Latch 245 may hold stowage bin 206 closed. After latch 245 is released, stowage bin 206 may be moved by a passenger applying force to handle 220. Handle 220 is an object through which a passenger will interact with the bin.

Specifically, handle 220 is a portion of stowage bin 206 that may be used to move stowage bin 206. For example, a passenger may push upward on handle 220 to close stowage bin 206. Alternatively, a passenger may pull downward on handle 220 to open stowage bin 206. In this illustrative example, cavity 222 is a space within stowage bin 206 that receives and holds number of items 224.

As depicted, stowage bin 206 moves between open position 226 and closed position 228. When stowage bin 206 is in open position 226, stowage bin 206 may receive number of items 224. Specifically, stowage bin 206 may receive number of items 224 in cavity 222.

In this illustrative example, number of items 224 is one or more items. Items in number of items 224 may include at least one of a bag, a briefcase, a carry-on item, clothing, passenger comfort items, electronic devices, emergency equipment, food, beverages, plants, or other suitable types of luggage and non-luggage items.

Number of items 224 has weight 230 in this illustrative example. Weight 230 of number of items 224 changes as items are added or taken out of stowage bin 206. For example, as additional items are placed into stowage bin 206, weight 230 increases. As items are removed from stowage bin 206, weight 230 decreases.

Once number of items 224 is placed in or removed from cavity 222, stowage bin 206 may be moved to closed position 228. In some illustrative examples, stowage bin 206 may then be latched or locked in closed position 228 by latch 245. For instance, when platform 204 takes the form of an aircraft, stowage bin 206 is locked in closed position 228 during operation of the aircraft such that number of items 224 remains in stowage bin 206.

As illustrated, stowage bin 206 moves between open position 226 and closed position 228 about number of pivot points 239. In some designs of stowage bin 206, stowage bin 206 may move about a single point, pivot 232. Pivot 232 may be directly connected to stowage bin 206 and structure 218 such that stowage bin 206 may rotate about pivot 232 from open position 226 to closed position 228. In more complex designs, number of pivot points 239 may be part of a four bar system, sliders, tracks or combinations thereof or other type of system in which stowage bin 206 moves about two or more pivot points. In some illustrative examples, number of pivot points 239 may be considered virtual pivot points.

Assist mechanism 208 generates a force used in closing stowage bin 206 in this illustrative example. Assist mechanism 208 may generate a force that assists in closing stowage bin 206. Specifically, assist mechanism 208 may supply closing force 234 to stowage bin 206 to help human operator 236 close stowage bin 206. In this manner, assist mechanism 208 reduces force 238 necessary for human operator 236 to close stowage bin 206. Closing force 234 may increase as weight 230 of number of items 224 in stowage bin 206 increases. Closing force 234 reduces force 238 required to move stowage bin 206 from open position 226 to closed position 228. Closing force 234 may be part of a range of possible assistive closing forces. Assistive closing forces are forces that help move stowage bin 206 from open position 226 to closed position 228.

A value of closing force 234 may be changed by changing aspects of assist mechanism 208 such as distance 240, lever arm 241, mechanical advantage 242, or a position of at least one structure of assist mechanism 208. Lever arm 241 may be a distance between fulcrum 277 and one or more components of assist mechanism 208. Fulcrum 277 is a point on which closing force 234 pivots. Fulcrum 277 may also be called an axis of rotation. A lever arm is a distance between a point of application of a force and a point about which the force rotates.

Distance 240 represents the distance between pivot 232 and one or more components of assist mechanism 208. In some illustrative examples, distance 240 may represent a length of lever arm 241 of assist mechanism 208. In these illustrative examples, assist mechanism 208 may be directly connected to stowage bin 206.

As depicted, closing force 234 is related to lever arm 241. Specifically, the value of closing force 234 is related to lever arm 241. Lever arm 241 may be changed based on weight 230 of number of items 224 in stowage bin 206. When lever arm 241 is changed, closing force 234 may also change. For example, lever arm 241 has a first length when a first amount of opening torque 243 that is applied to stowage bin 206 by number of items 224 and a second length that is greater than the first length when a second amount of opening torque 243 is applied to stowage bin 206 by number of items 224, and the second amount is greater than the first amount.

In this depicted example, assist mechanism 208 has mechanical advantage 242. Mechanical advantage 242 is a measure of force amplification achieved by using assist mechanism 208. Mechanical advantage 242 changes based on a change of lever arm 241.

As depicted, assist mechanism 208 includes force generation device 246 and adjustment mechanism 248. Force generation device 246 includes a number of components attached to stowage bin 206. Force generation device 246 provides force assist in closing stowage bin 206. Specifically, force generation device 246 generates first force 249 to provide closing force 234 to move stowage bin 206 from open position 226 to closed position 228. In this depicted example, force generation device 246 may comprise at least one of tension spring 203, compression spring 205, torsion spring 247, strut 207, gas strut 209, weight 211, motor 213, magnet 215, or other desirable force generation devices. These components may be connected to stowage bin 206 or arranged about stowage bin 206 such that assist mechanism 208 provides closing force 234. In some illustrative examples, assist mechanism 208 has mechanical advantage 242 that changes to provide closing force 234.

As depicted, force generation device 246 has fixed end 250 and movable end 252. In this depicted example, fixed end 250 does not move relative to the structure that it is attached to. In an illustrative example, fixed end 250 of force generation device 246 is attached to structure 218 in platform 204. In another illustrative example, fixed end 250 of force generation device 246 is attached to stowage bin 206. In either case, although fixed end 250 may pivot or rotate about this attachment point, it does not move a distance from the attachment point.

In this illustrative example, movable end 252 of force generation device 246 moves back and forth along path 254. In some illustrative examples, movable end 252 moves along path 254 in an arc about fixed end 250 to change the length of lever arm 241. Adjustment mechanism 248 comprises a number of components attached to movable end 252 of force generation device 246. Adjustment mechanism 248 moves movable end 252 to change lever arm 241 to provide closing force 234. In other words, adjustment mechanism 248 moves movable end 252 to change a distance between movable end 252 and fulcrum 277 to provide closing force 234. Adjustment mechanism 248 may adjust closing force 234 based on data from number of sensors 210.

In this depicted example, a distance between fulcrum 277 and movable end 252 of force generation device 246 may increase as weight 230 of number of items 224 in stowage bin 206 increases. In a similar fashion, a distance between fulcrum 277 and movable end 252 of force generation device 246 may decrease as weight 230 of number of items 224 in stowage bin 206 decreases.

In an illustrative example, adjustment mechanism 248 includes various components. For example, adjustment mechanism 248 may include mechanical, electromechanical, or other types of components. In this illustrative example, adjustment mechanism 248 may take the form of an actuator.

As depicted, adjustment mechanism 248 moves movable end 252 of force generation device 246 along path 254. In this illustrative example, path 254 may be a predefined track for movable end 252 of force generation device 246.

Path 254 is an arc about fixed end 250 in this illustrative example. In this manner, movable end 252 of force generation device 246 moves in a curved path about an axis shared with fixed end 250.

In some illustrative examples, guide device 256 is a structure that guides movable end 252 of force generation device 246 along path 254. Guide device 256 guides movement of point of application 257 of first force 249 along path 254. Guide device 256 may be selected from one of track 217, linkage 219, rail 221, groove 223, or other desirable components.

As illustrated, number of sensors 210 is connected to structure 218, stowage bin 206, or both. In this illustrative example, number of sensors 210 may include one or more pressure sensors, load cells, distance sensors, cameras, or other types of sensors. Number of sensors 210 measures a number of forces on stowage bin 206. Number of sensors 210 identifies at least one of weight 230 of number of items 224 in stowage bin 206, an amount of force 238 applied to structure 218 by number of items 224 in stowage bin 206, or an amount of force 238 applied to handle 220 of stowage bin 206 by human operator 236.

Number of sensors 210 supplies data 255. In some examples, assist mechanism 208 has lever arm 241 between point of application 257 of first force 249 by force generation device 246 and an axis of rotation, and the length of lever arm 241 is changed based on an amount of opening torque 243 applied to stowage bin 206 by number of items 224 as determined based on data 255 from number of sensors 210.

Number of sensors 210 includes first sensor 259 and second sensor 261. First sensor 259 may take a measurement of amount of opening force 263 applied to stowage bin 206. In one illustrative example, amount of opening force 263 applied to stowage bin 206 is an amount of opening torque 243 applied by number of items 224 within stowage bin 206 and an amount of force 238 applied to handle 220 of stowage bin 206 by human operator 236. In another illustrative example, the amount of opening force 263 applied to stowage bin 206 is an amount of opening torque 243 applied by number of items 224 within stowage bin 206. Second sensor 261 may take a measurement of the amount of force 238 applied to handle 220 of stowage bin 206 by human operator 236.

In this illustrative example, number of sensors 210 communicates with controller 212. Controller 212 also communicates with adjustment mechanism 248. Controller 212 may communicate with at least one of number of sensors 210 or adjustment mechanism 248 using any number of wireless communications links, wired communications links, optical communications links, or other types of communications links. Controller 212 compares data from number of sensors 210. Controller 212 is a device that identifies a desired value for closing force 234 to be provided by assist mechanism 208 based on data from number of sensors 210. Controller 212 may also direct adjustment mechanism 248 to change a position of at least one structure of assist mechanism 208 to provide closing force 234. Specifically, controller 212 may direct adjustment mechanism 248 to change a length of lever arm 241 of assist mechanism 208 to provide closing force 234. For example, controller 212 may generate commands to control the operation of adjustment mechanism 248. Adjustment mechanism 248 may move point of application 257 of first force 249 by force generation device 246 to change the length of lever arm 241 based on amount of opening torque 243 applied to stowage bin 206 by number of items 224.

In this depicted example, controller 212 identifies desired position 260 for force generation device 246 based on a desired value for closing force 234, and activates adjustment mechanism 248 to move force generation device 246 to desired position 260. For example, adjustment mechanism 248 may move movable end 252 of force generation device 246 to desired position 260.

Desired position 260 may be a position along path 254. Distance 240 is the distance from pivot 232 of stowage bin 206 and desired position 260 of force generation device 246.

In this illustrative example, controller 212 may be implemented in software, hardware, firmware, or a combination thereof. When software is used, the operations performed by controller 212 may be implemented using, for example, without limitation, program code configured to run on a processor unit. When firmware is used, the operations performed by controller 212 may be implemented using, for example, without limitation, program code and data and stored in persistent memory to run on a processor unit.

When hardware is employed, the hardware may include one or more circuits that operate to perform the operations in performed by controller 212. Depending on the implementation, the hardware may take the form of a circuit system, an integrated circuit, an application specific integrated circuit (ASIC), a programmable logic device, or some other suitable type of hardware device configured to perform any number of operations.

A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

In some illustrative examples, the operations, processes, or both performed by controller 212 may be performed using organic components integrated with inorganic components. In some cases, the operations, processes, or both may be performed by entirely organic components, excluding a human being. As one illustrative example, circuits in organic semiconductors may be used to perform these operations, processes, or both.

As illustrated, movement inhibitor 214 includes a number of components physically associated with movable end 252 of force generation device 246. Movement inhibitor 214 locks movable end 252 in place when stowage bin 206 is in open position 226. For example, after movable end 252 is moved a desired distance from pivot 232, movement inhibitor 214 prevents movable end 252 from moving out of position. As an example, movement inhibitor 214 reduces slippage or other undesired movement to ensure that a desired value for closing force 234 is maintained. Movement inhibitor 214 is associated with point of application 257 of first force 249 by force generation device 246, wherein movement inhibitor 214 engages to substantially prevent the length of lever arm 241 from changing as stowage bin 206 moves from open position 226 to closed position 228.

As used herein, a first component, such as movement inhibitor 214, may be considered to be associated with a second component, such as movable end 252 of force generation device 246, by being secured to the second component, bonded to the second component, mounted to the second component, welded to the second component, fastened to the second component, connected to the second component in some other suitable manner, or a combination thereof. The first component also may be connected to the second component using a third component. Further, the first component may be considered to be associated with the second component by being formed as part of, as an extension of the second component, or a combination thereof.

In this depicted example, locking mechanism 216 is connected to stowage bin 206. Locking mechanism 216 locks stowage bin 206 in open position 226 while movable end 252 of force generation device 246 moves relative to pivot 232 of stowage bin 206. Locking mechanism 216 locks stowage bin 206 in open position 226 while length of lever arm 241 changes. In this manner, human operator 236 cannot close stowage bin 206 until distance 240 is set to provide a desired value of closing force 234 in closing stowage bin 206.

Movement inhibitor 214 and locking mechanism 216 each may comprise the same or different types of components in this illustrative example. For instance, movement inhibitor 214, locking mechanism 216, or both may comprise at least one of rack and pinion 225, clamp 227, roller cam clamp 229, non-back drive actuator 231, latch 235, magnetic lock 237, or other suitable components.

The illustration of overhead stowage system 202 in FIG. 2 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Although the illustrative examples are for an illustrative embodiment and are described with respect to an aircraft, an illustrative embodiment may be applied to other types of platforms. Platform 204 may be, for example, without limitation, a mobile platform, a stationary platform, a land-based structure, an aquatic-based structure, and a space-based structure. More specifically, platform 204 may be a surface ship, a tank, a personnel carrier, a train, a spacecraft, a submarine, an automobile, a house, a manufacturing facility, a building, and other suitable platforms.

Further, in some illustrative examples, controller 212, number of sensors 210, or both may be absent. Instead, a desired value for closing force 234 may be manually set, determined by mechanical devices, or some combination thereof.

Figure 3:
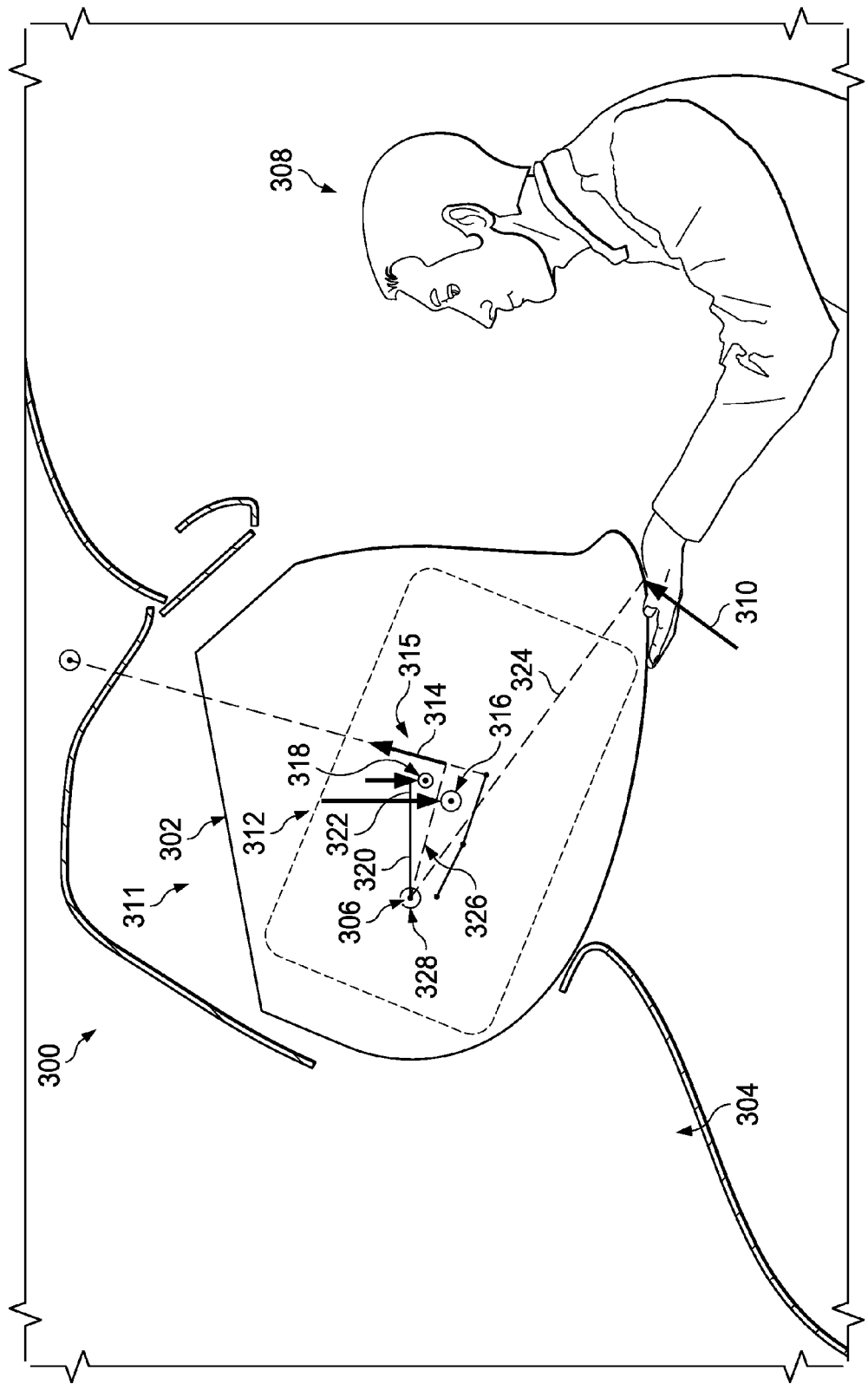
FIG. 3 is an illustration of a force diagram of a stowage bin in accordance with an illustrative embodiment.

Turning now to FIG. 3, an illustration of a force diagram of a stowage bin is depicted in accordance with an illustrative embodiment. In stowage environment 300, stowage bin 302 is movably connected to structure 304. The movable connection between stowage bin 302 and structure 304 has a number of pivot points. As depicted, stowage bin 302 has pivot point 306. In other illustrative embodiments, stowage bin 302 may have more than one pivot point or other types of articulation.

As depicted, human operator 308 applies force 310 to move stowage bin 302 from open position 311 to a closed position. Other forces on stowage bin 302 include weight 312 of a number of items within stowage bin 302, closing force 314, and weight 315 of stowage bin 302 itself. Weight 315 remains constant. However, weight 312 of the number of items increases or decreases as items are added or removed from stowage bin 302. Closing force 314 is provided by an assist mechanism (not pictured). Closing force 314 is adjustable across a range of values. Closing force 314 is increased or decreased by changing a mechanical advantage of the assist mechanism. By increasing closing force 314, force 310 is decreased. In other words, closing force 314 is an assistive closing force. Closing force 314 is part of a range of possible assistive closing forces. Closing force 314 reduces force 310 required to move stowage bin 302 from open position 311 to a closed position.

As depicted, number of items within stowage bin 302 would have center of gravity 316. Stowage bin 302 has center of gravity 318. Each force has a respective lever arm. A number of items within stowage bin 302 has lever arm 320. Stowage bin 302 has lever arm 322. Force 310 has lever arm 324. Closing force 314 has lever arm 326. By changing lever arm 326, the value of closing force 314 changes. For example, when weight 312 increases, lever arm 326 may be changed to increase the value of closing force 314. As another example, when items are removed from stowage bin 302 to decrease weight 312, lever arm 326 may be changed to decrease the value of closing force 314.

As depicted, fulcrum 328 is the same as pivot point 306 of stowage bin 302. However, in other illustrative examples, fulcrum 328 may be positioned in locations other than pivot point 306 of stowage bin 302.

Figure 4:
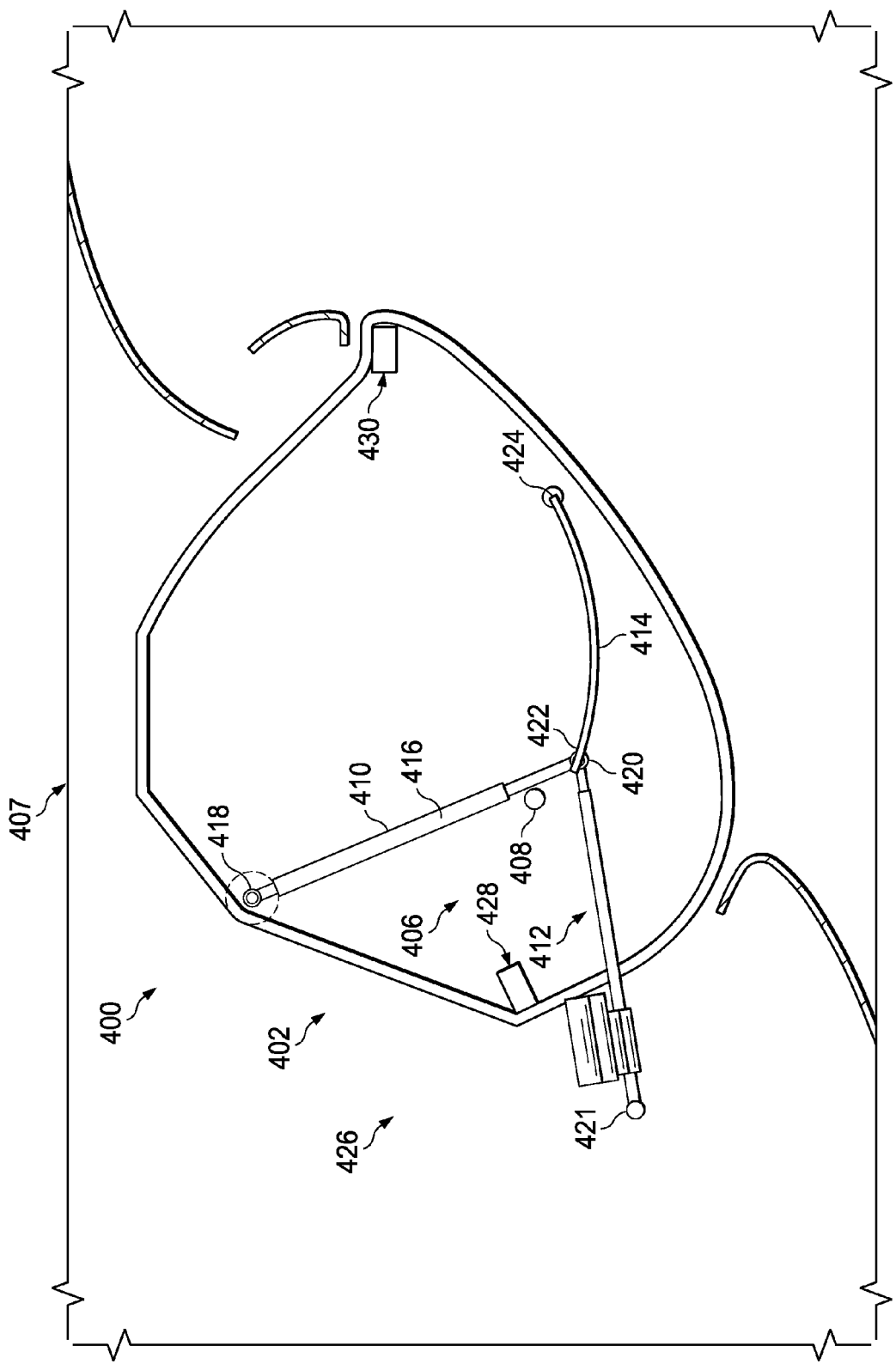
FIG. 4 is an illustration of one example of a closed stowage bin with minimal assistive closing force in accordance with an illustrative embodiment.

Turning now to FIG. 4, an illustration of one example of a closed stowage bin with minimal assistive closing force is depicted in accordance with an illustrative embodiment. As depicted, stowage environment 400 includes stowage bin 402, and assist mechanism 406. Stowage bin 402 may be a physical implementation of stowage bin 206 in stowage environment 200 of FIG. 2. Stowage bin 402 is in closed position 407. Stowage bin 402 is directly movably connected to a structure by pivot 408.

Assist mechanism 406 includes force generation device 410, adjustment mechanism 412, and guide device 414. As depicted, force generation device 410 takes the form of strut 416. Force generation device 410 has fixed end 418 and movable end 420. Fixed end 418 remains connected to stowage bin 402 in the same location. Movable end 420 translates along guide device 414 to change a closing force supplied by assist mechanism 406. Movable end 420 may be moved to and maintained at various positions along guide device 414. The closing force has a value within a range of assistive closing force values. As depicted, force generation device 410 is positioned to provide a minimum value for an assistive closing force.

Adjustment mechanism 412 moves movable end 420 along guide device 414 to change the closing force supplied by assist mechanism 406. Adjustment mechanism 412 may adjust the closing force based on data from a number of sensors. As depicted, adjustment mechanism 412 takes the form of an actuator movably connected to the structure at pivot point 421.

In this illustrative example, guide device 414 is an arc. Guide device 414 has first end 422 and second end 424. When movable end 420 is at first end 422, the closing force has a minimum value. When movable end 420 is at second end 424, the closing force has a maximum value.

Number of sensors 426 is associated with stowage bin 402. Number of sensors 426 may measure a number of forces on stowage bin 402. Number of sensors 426 may supply data. As depicted, number of sensors 426 includes first sensor 428 and second sensor 430. First sensor 428 may take a measurement of an amount of opening force applied to stowage bin 402. The amount of opening force applied to stowage bin 402 is an amount of opening torque applied by a number of items within stowage bin 402 and an amount of force applied to the handle of stowage bin 402 by a human operator. Second sensor 430 takes a measurement of the amount of force applied to the handle of stowage bin 402 by the human operator. Data from first sensor 428 and second sensor 430 may be used to determine the amount of opening torque applied by the number of items. The determined amount of opening torque applied by the number of items may be used to determine a desired closing force to be supplied by assist mechanism 406.

Figure 5:
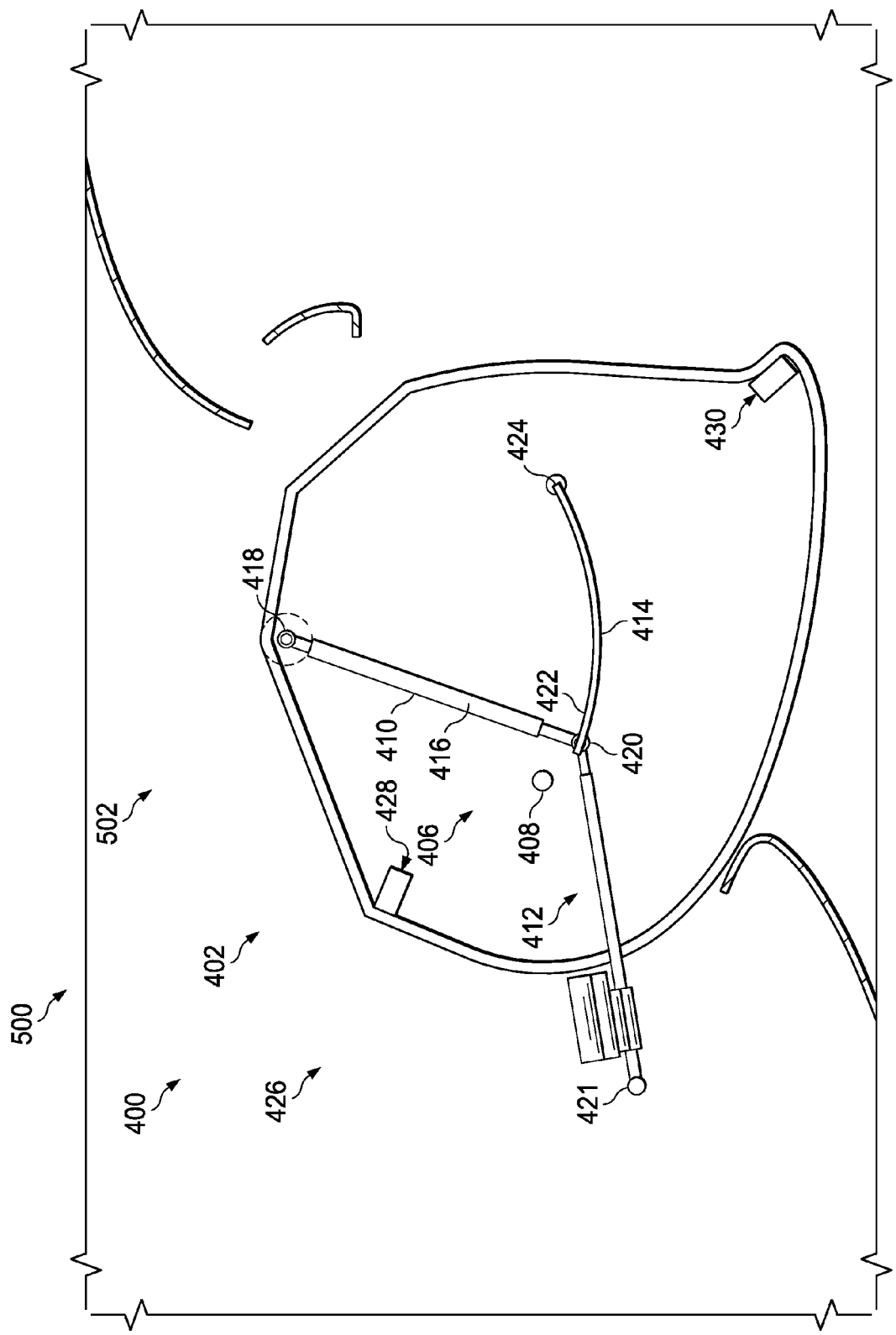
FIG. 5 is an illustration of one example of an open stowage bin with minimal assistive closing force in accordance with an illustrative embodiment.

Turning now to FIG. 5, an illustration of one example of an open stowage bin with minimal assistive closing force is depicted in accordance with an illustrative embodiment. View 500 is a view of stowage bin 402 in open position 502. Specifically, stowage bin 402 has rotated clock-wise about pivot 408 from closed position 407 of FIG. 4.

Figure 6:
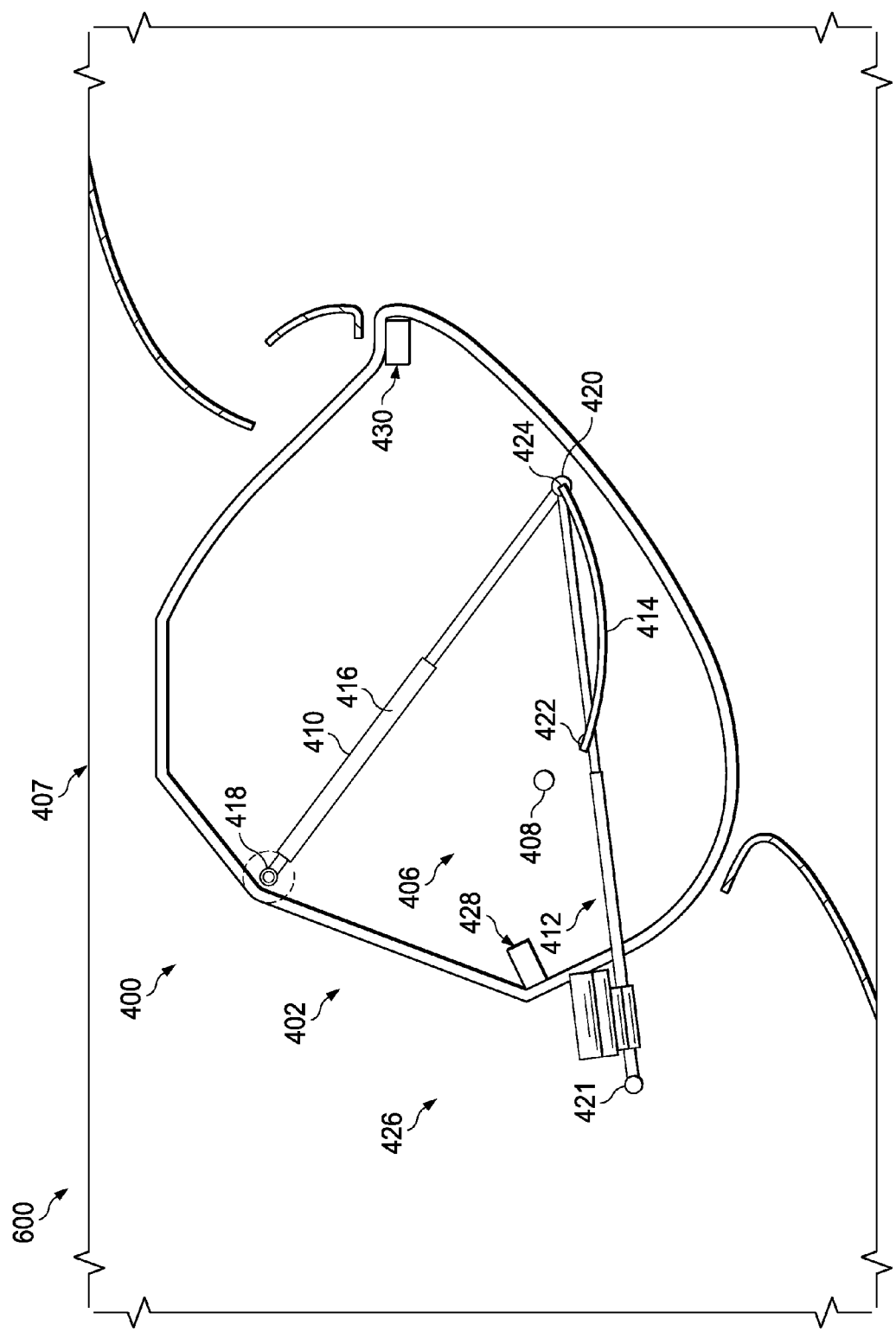
FIG. 6 is an illustration of one example of a closed stowage bin with maximum assistive closing force in accordance with an illustrative embodiment.

Turning now to FIG. 6, an illustration of one example of a closed stowage bin with maximum assistive closing force is depicted in accordance with an illustrative embodiment. View 600 is a view of stowage bin 402 in closed position 407. As depicted, adjustment mechanism 412 has moved movable end 420 of force generation device 410 to second end 424 of guide device 414.

Figure 7:
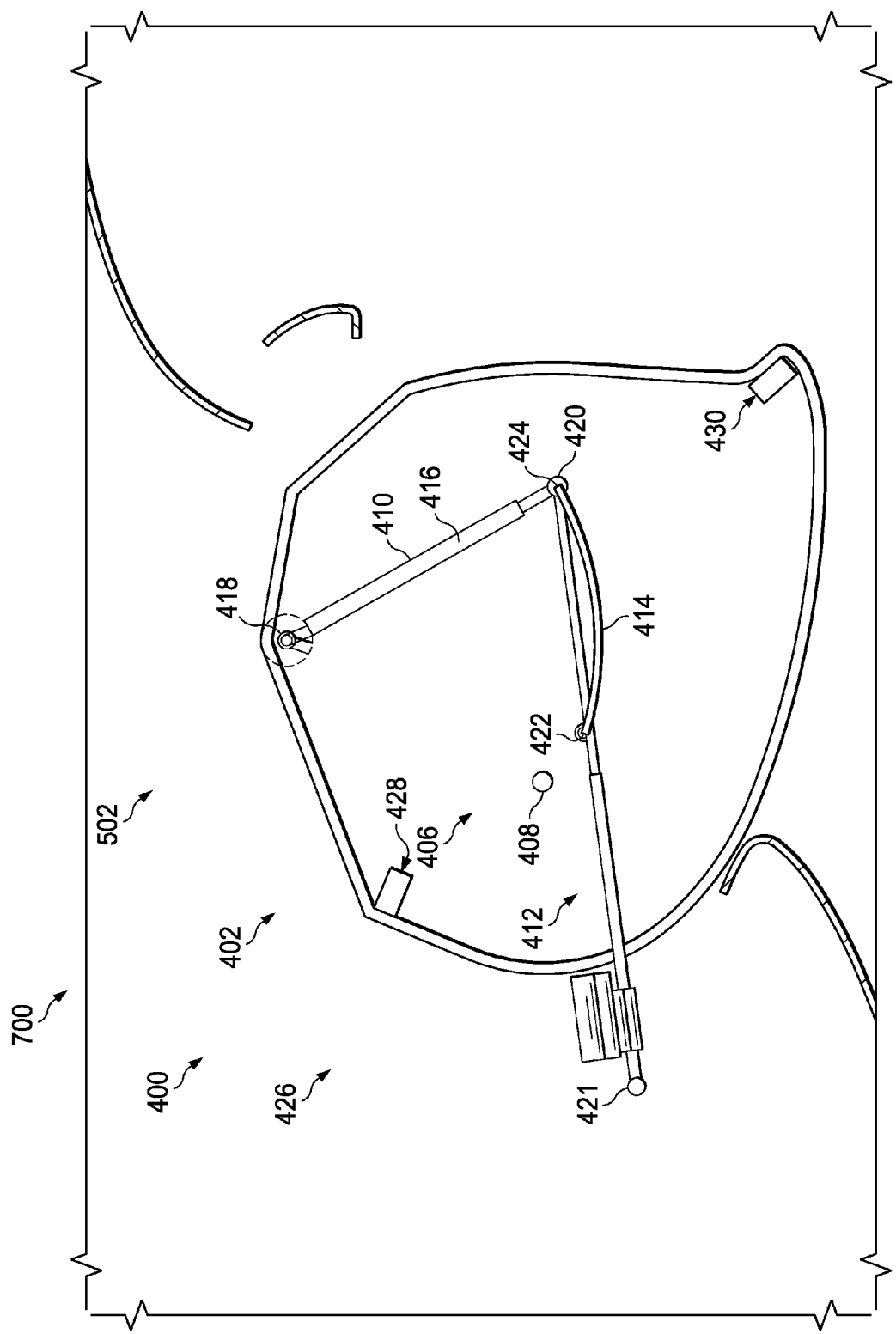
FIG. 7 is an illustration of one example of an open stowage bin with maximum assistive closing force in accordance with an illustrative embodiment.

Turning now to FIG. 7, an illustration of one example of an open stowage bin with maximum assistive closing force in accordance with an illustrative embodiment. View 700 is a view of stowage bin 402 in open position 502 with maximum assistive closing force. Specifically, stowage bin 402 has rotated clock-wise about pivot 408 from closed position 407 of FIG. 6.

Figure 8:
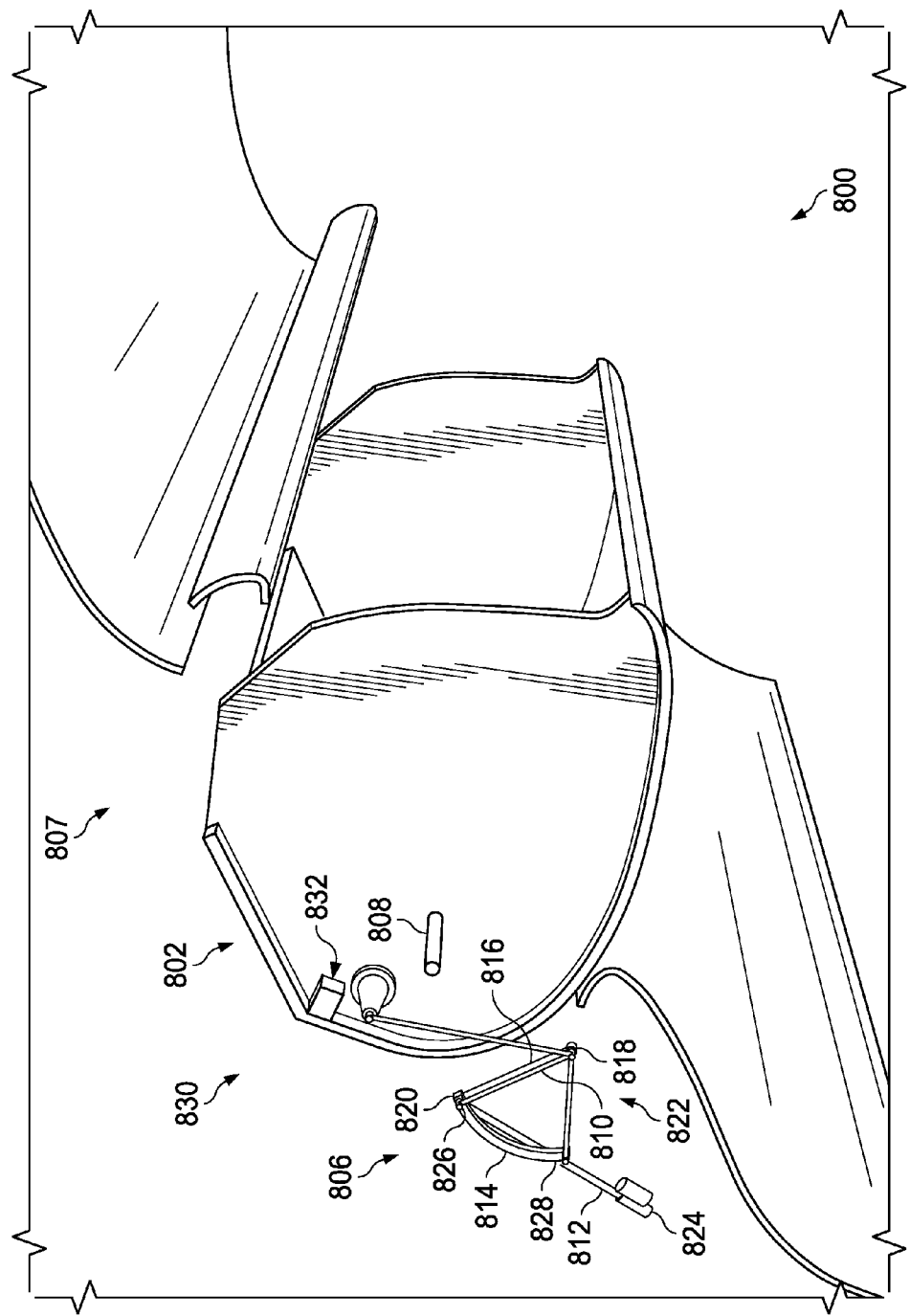
FIG. 8 is an illustration of another example of an open stowage bin with maximum assistive closing force in accordance with an illustrative embodiment.

Turning now to FIG. 8, an illustration of another example of an open stowage bin with maximum assistive closing force is depicted in accordance with an illustrative embodiment. As depicted, stowage environment 800 includes stowage bin 802 and assist mechanism 806. Stowage bin 802 may be a physical implementation of stowage bin 206 in stowage environment 200 of FIG. 2. Stowage bin 802 is in open position 807. Stowage bin 802 is directly movably connected to the structure by pivot 808.

Assist mechanism 806 includes force generation device 810, adjustment mechanism 812, and guide device 814. As depicted, force generation device 810 takes the form of compression strut 816. Force generation device 810 has fixed end 818 and movable end 820. Fixed end 818 remains connected to linkage 822. Linkage 822 is connected to stowage bin 802 and the structure (not depicted). Movable end 820 translates along guide device 814 to change a closing force supplied by assist mechanism 806. Movable end 820 may be moved to and maintained at various positions along guide device 814. The closing force has a value within a range of assistive closing force values. As depicted, force generation device 810 is positioned to provide a maximum value for an assistive closing force.

Adjustment mechanism 812 moves movable end 820 along guide device 814 to change the closing force supplied by assist mechanism 806. Adjustment mechanism 812 may adjust the closing force based on data from a number of sensors. As depicted, adjustment mechanism 812 takes the form of an actuator movably connected to structure 804 at pivot point 824.

In this illustrative example, guide device 814 is an arc. Guide device 814 has first end 826 and second end 828. When movable end 820 is at first end 826, the closing force has a maximum value. When movable end 820 is at second end 828, the closing force has a minimum value.

Number of sensors 830 is associated with stowage bin 802. Number of sensors 830 may measure a number of forces on stowage bin 802. Number of sensors 830 may supply data. As depicted, number of sensors 830 includes first sensor 832. First sensor 832 may take a measurement of an amount of an opening force applied to stowage bin 802. The amount of opening force applied to stowage bin 802 is an amount of opening torque applied by a number of items within stowage bin 802. As depicted, first sensor 832 is able to measure the amount of opening torque applied by a number of items within stowage bin 802 directly. As a result, number of sensors 830 does not include a second sensor to take a measurement of the amount of force applied to the handle of stowage bin 802 by the human operator in this illustrative example. Data from first sensor 832 may be used to determine a desired closing force to be supplied by assist mechanism 806. The determined amount of opening torque applied by the number of items may be used to determine a desired closing force to be supplied by assist mechanism 806.

Figure 9:
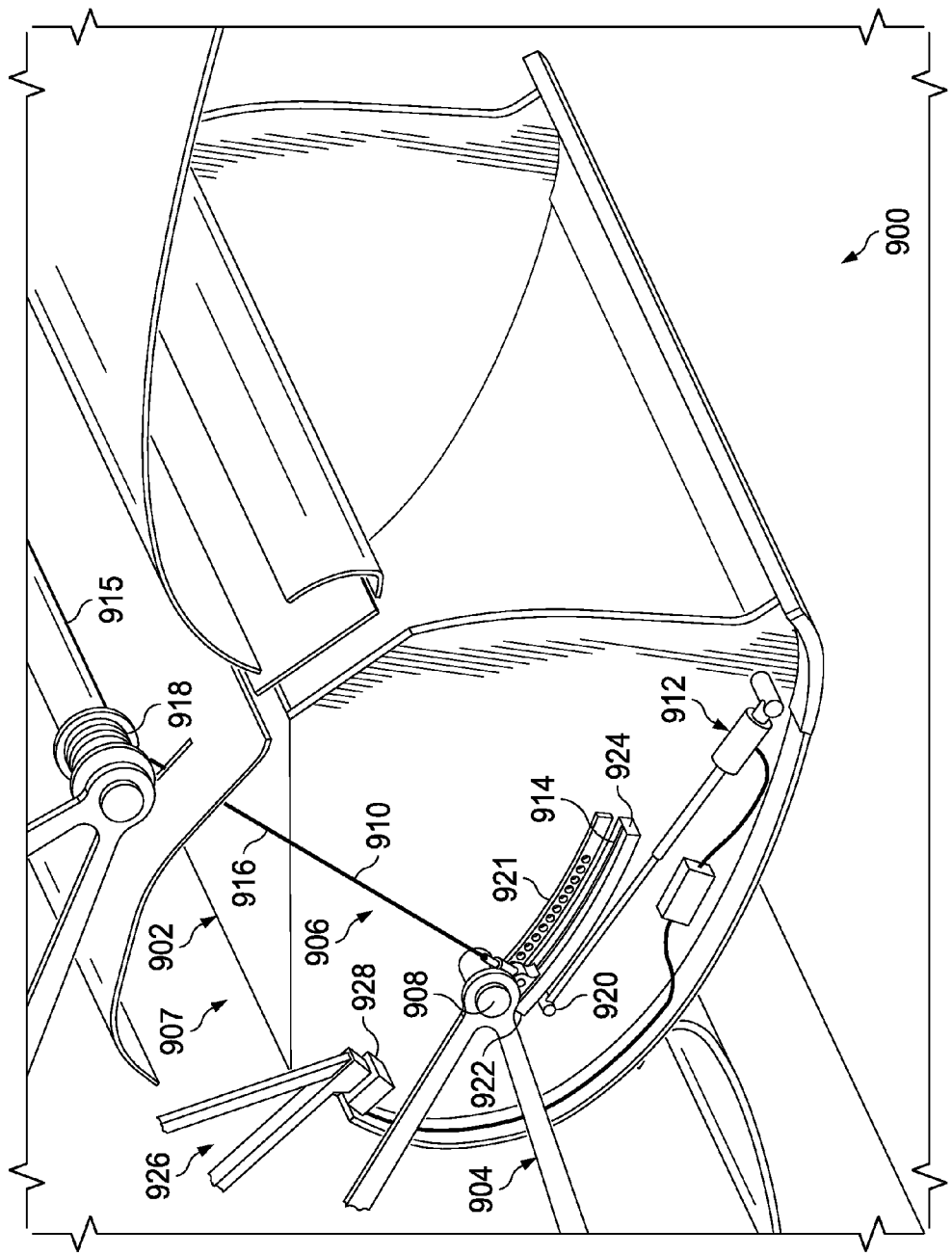
FIG. 9 is an illustration of a further example of an open stowage bin with minimum assistive closing force in accordance with an illustrative embodiment.

Turning now to FIG. 9, an illustration of a further example of an open stowage bin with minimum assistive closing force is depicted in accordance with an illustrative embodiment. As depicted, stowage environment 900 includes stowage bin 902, structure 904, and assist mechanism 906. Stowage bin 902 may be a physical implementation of stowage bin 206 in stowage environment 200 of FIG. 2. Stowage bin 902 is in open position 907. Stowage bin 902 is movably connected to structure 904 by pivot 908. As depicted, pivot 908 is directly connected to structure 904. As depicted, structure 904 is an airframe.

Assist mechanism 906 includes force generation device 910, adjustment mechanism 912, and guide device 914. As depicted, force generation device 910 takes the form of torsion spring 915 and cable 916. Force generation device 910 has fixed end 918 and movable end 920. Fixed end 918 remains connected to structure 904. Movable end 920 translates along guide device 914 to change a closing force supplied by assist mechanism 906. Movable end 920 may be moved to and maintained at various positions along guide device 914. Movable end 920 may be maintained at a position by movement inhibitor 921. The closing force has a value within a range of assistive closing force values. As depicted, force generation device 910 is positioned to provide a minimum value for an assistive closing force.

Adjustment mechanism 912 moves movable end 920 along guide device 914 to change the closing force supplied by assist mechanism 906. Adjustment mechanism 912 may adjust the closing force based on data from a number of sensors. As depicted, adjustment mechanism 912 takes the form of an actuator movably connected to stowage bin 902.

In this illustrative example, guide device 914 is an arc. Guide device 914 has first end 922 and second end 924. When movable end 920 is at first end 922, the closing force has a minimum value. When movable end 920 is at second end 924, the closing force has a maximum value.

Number of sensors 926 is associated with stowage bin 902. Number of sensors 926 may measure a number of forces on stowage bin 902. Number of sensors 926 may supply data. As depicted, number of sensors 926 includes first sensor 928.

First sensor 928 may take a measurement of an amount of opening force applied to stowage bin 902. The amount of opening force applied to stowage bin 902 is an amount of opening torque applied by a number of items within stowage bin 902. As depicted, first sensor 928 is able to measure the amount of opening torque applied by a number of items within stowage bin 902 directly. As a result, number of sensors 926 does not include a second sensor to take a measurement of the amount of force applied to the handle of stowage bin 902 by the human operator in this illustrative example. Data from first sensor 928 may be used to determine a desired closing force to be supplied by assist mechanism 906. The determined amount of opening torque applied by the number of items may be used to determine a desired closing force to be supplied by assist mechanism 906. In other illustrative examples, number of sensors 926 may include a second sensor to provide additional data for determining a desired closing force.

Figure 10:
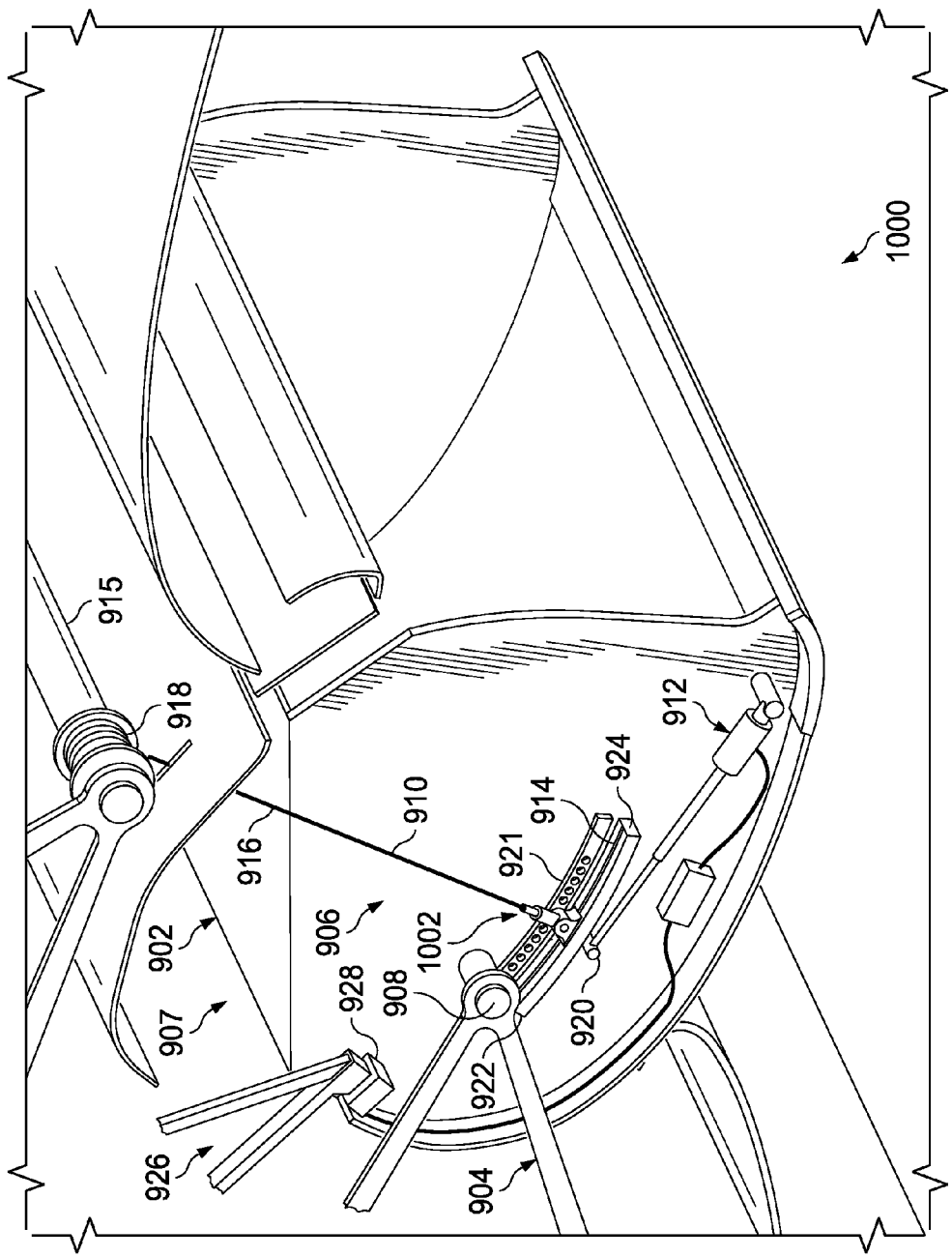
FIG. 10 is an illustration of a further example of an open stowage bin with an assistive closing force in accordance with an illustrative embodiment.

Turning now to FIG. 10, an illustration of a further example of an open stowage bin with an assistive closing force is depicted in accordance with an illustrative embodiment. View 1000 is a view of stowage bin 902 in open position 907 with a second closing force. Specifically, this second closing force is a greater closing force than depicted in FIG. 9. This second closing force is accomplished by moving movable end 920 from first end 922 to location 1002 on guide device 914.

Figure 11:
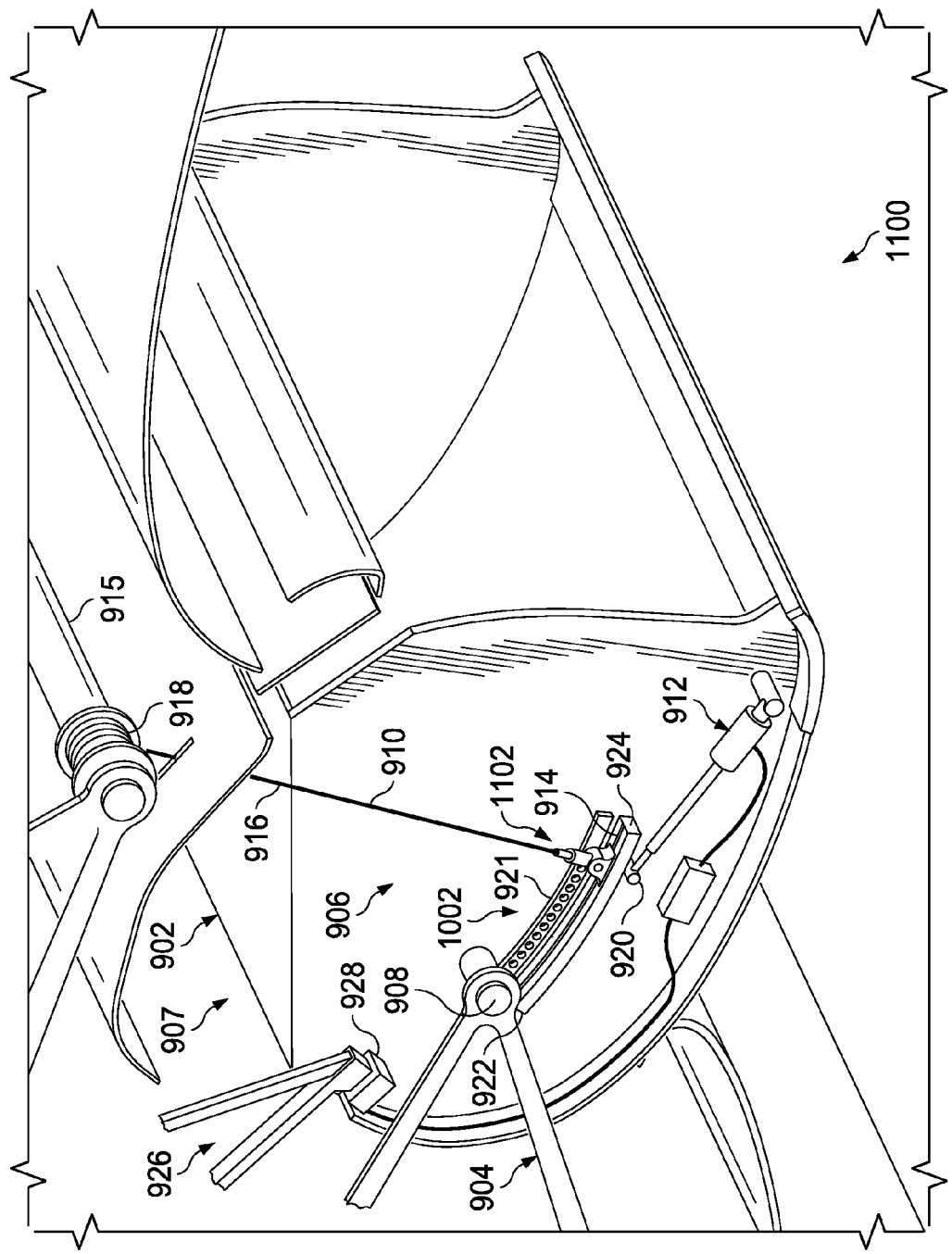
FIG. 11 is an illustration of a further example of an open stowage bin with an assistive closing force in accordance with an illustrative embodiment.

Turning now to FIG. 11, an illustration of a further example of an open stowage bin with an assistive closing force is depicted in accordance with an illustrative embodiment. View 1100 is a view of stowage bin 902 in open position 907 with a third closing force. Specifically, this third closing force is a greater closing force than depicted in either FIG. 9 or FIG. 10. This third closing force is accomplished by moving movable end 920 from location 1002 to location 1102 on guide device 914.

Figure 12:
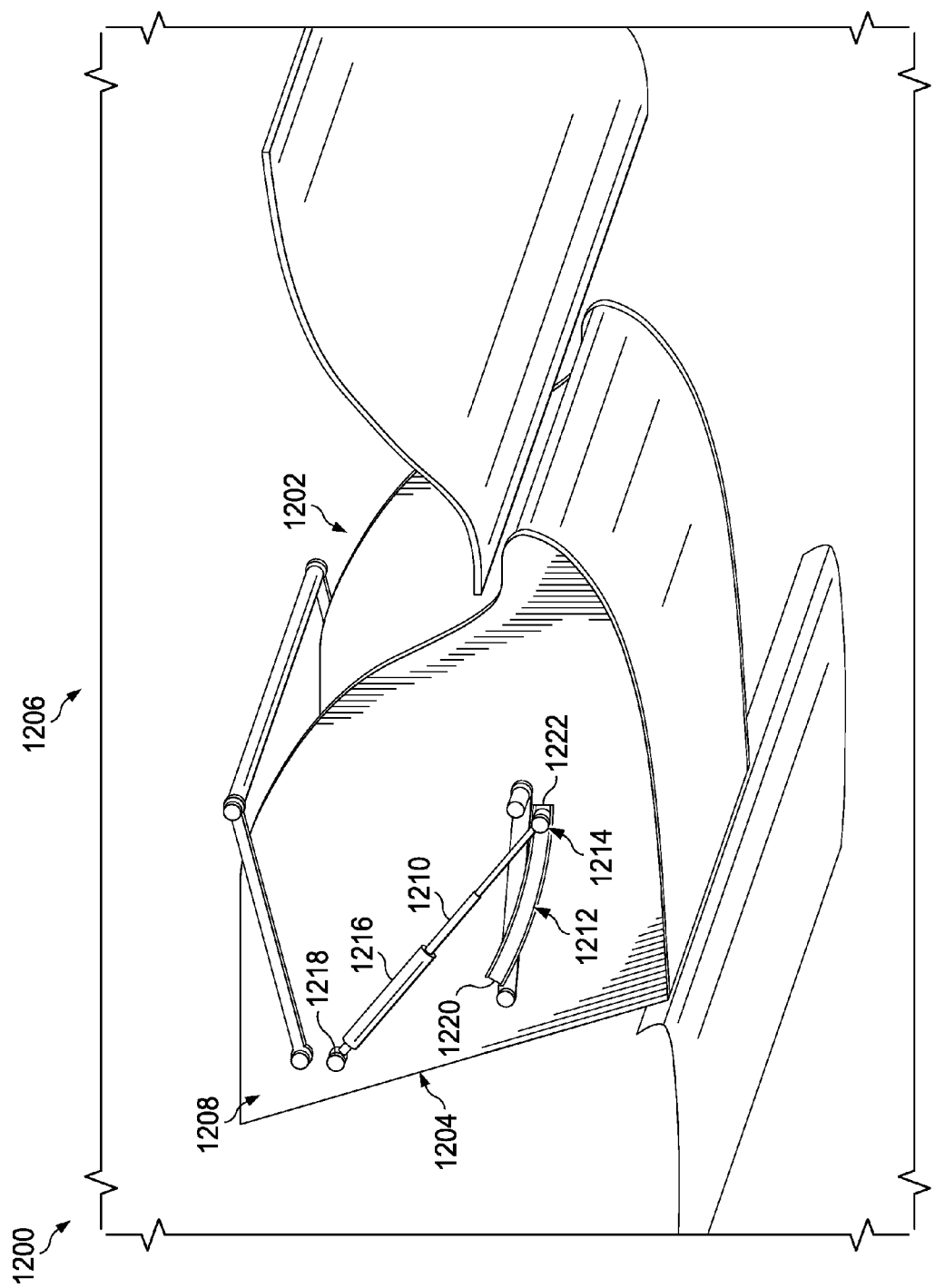
FIG. 12 is an illustration of a simplified view of yet a further example of a closed stowage bin with a minimum assistive closing force in accordance with an illustrative embodiment.

Turning now to FIG. 12, an illustration of a simplified view of a yet further example of a closed stowage bin with a minimum assistive closing force is depicted in accordance with an illustrative embodiment. As depicted, stowage environment 1200 includes stowage bin 1202 and assist mechanism 1204. Stowage bin 1202 may be a physical implementation of stowage bin 206 in stowage environment 200 of FIG. 2. Stowage bin 1202 is in closed position 1206. Stowage bin 1202 is movably connected to a structure by number of pivots 1208. As depicted, number of pivots 1208 takes the form of a four-bar assembly.

Assist mechanism 1204 includes force generation device 1210 and guide device 1212. An adjustment mechanism is not depicted, but would be used to move movable end 1214 of force generation device 1210. As depicted, force generation device 1210 takes the form of strut 1216. Strut 1216 may be a gas strut. In other illustrative examples, a tension spring enclosed within a housing may be used instead of strut 1216. Force generation device 1210 has fixed end 1218 and movable end 1214. Fixed end 1218 remains connected to an aircraft structure (not depicted). Movable end 1214 translates along guide device 1212 to change a closing force supplied by assist mechanism 1204. Movable end 1214 may be moved to and maintained at various positions along guide device 1212. The closing force has a value within a range of assistive closing force values. As depicted, force generation device 1210 is positioned to provide a minimum value for an assistive closing force.

In this illustrative example, guide device 1212 is an arc. Guide device 1212 has first end 1220 and second end 1222. When movable end 1214 is at first end 1220, the closing force has a maximum value. When movable end 1214 is at second end 1222, the closing force has a minimum value.

Although not depicted in this simplified illustration, several other components may be present in this example. For example, this embodiment may have at least one of an adjustment mechanism, controller, or number of sensors.

Figure 13:
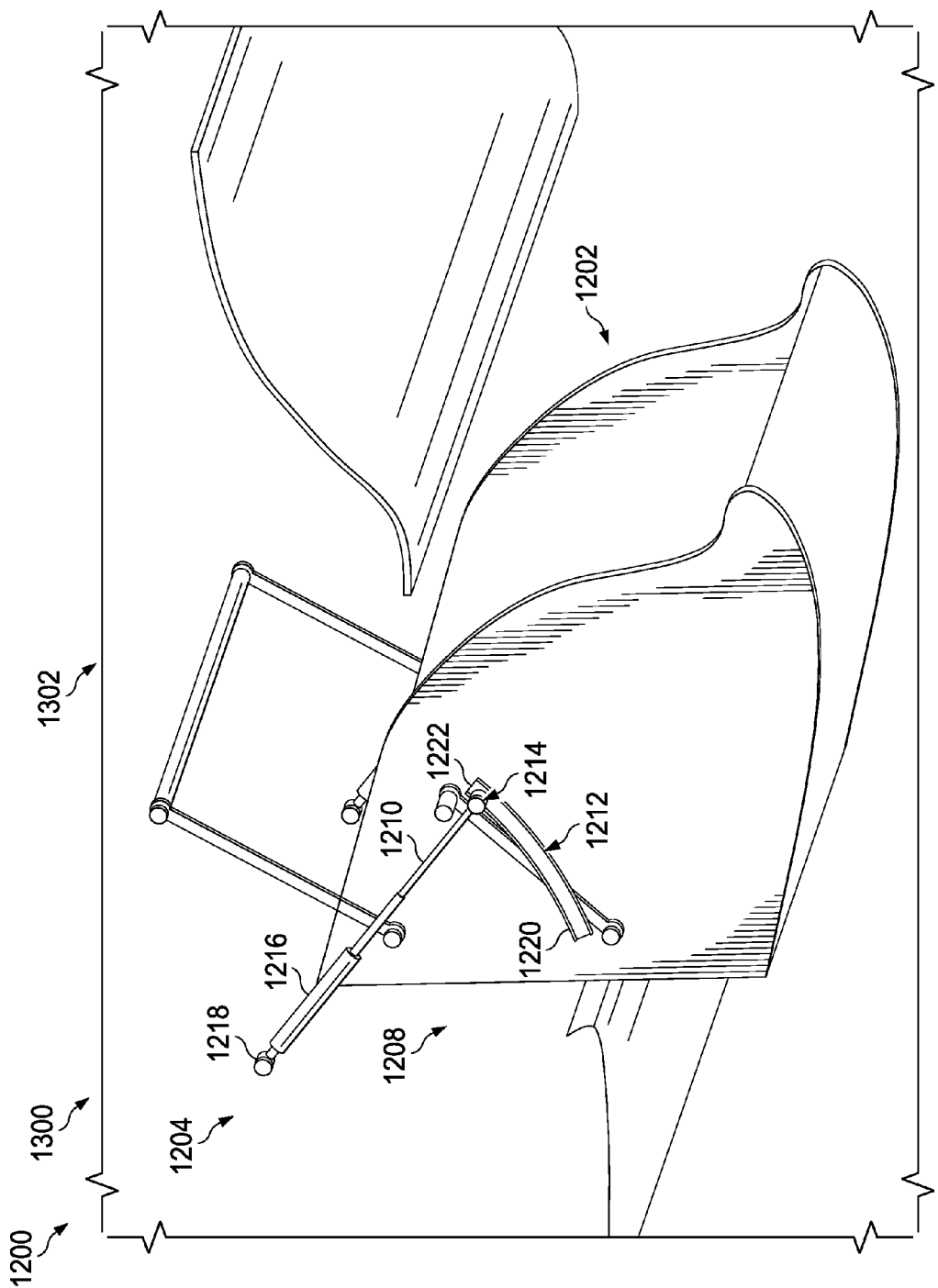
FIG. 13 is an illustration of a simplified view of yet a further example of an open stowage bin with a minimum assistive closing force in accordance with an illustrative embodiment.

Turning now to FIG. 13, an illustration of a simplified view of a yet further example of an open stowage bin with a minimum assistive closing force is depicted in accordance with an illustrative embodiment. View 1300 is a view of stowage bin 1202 in open position 1302. As depicted, adjustment mechanism (not shown) has moved movable end 1214 of force generation device 1210 to second end 1222 of guide device 1212.

Figure 14:
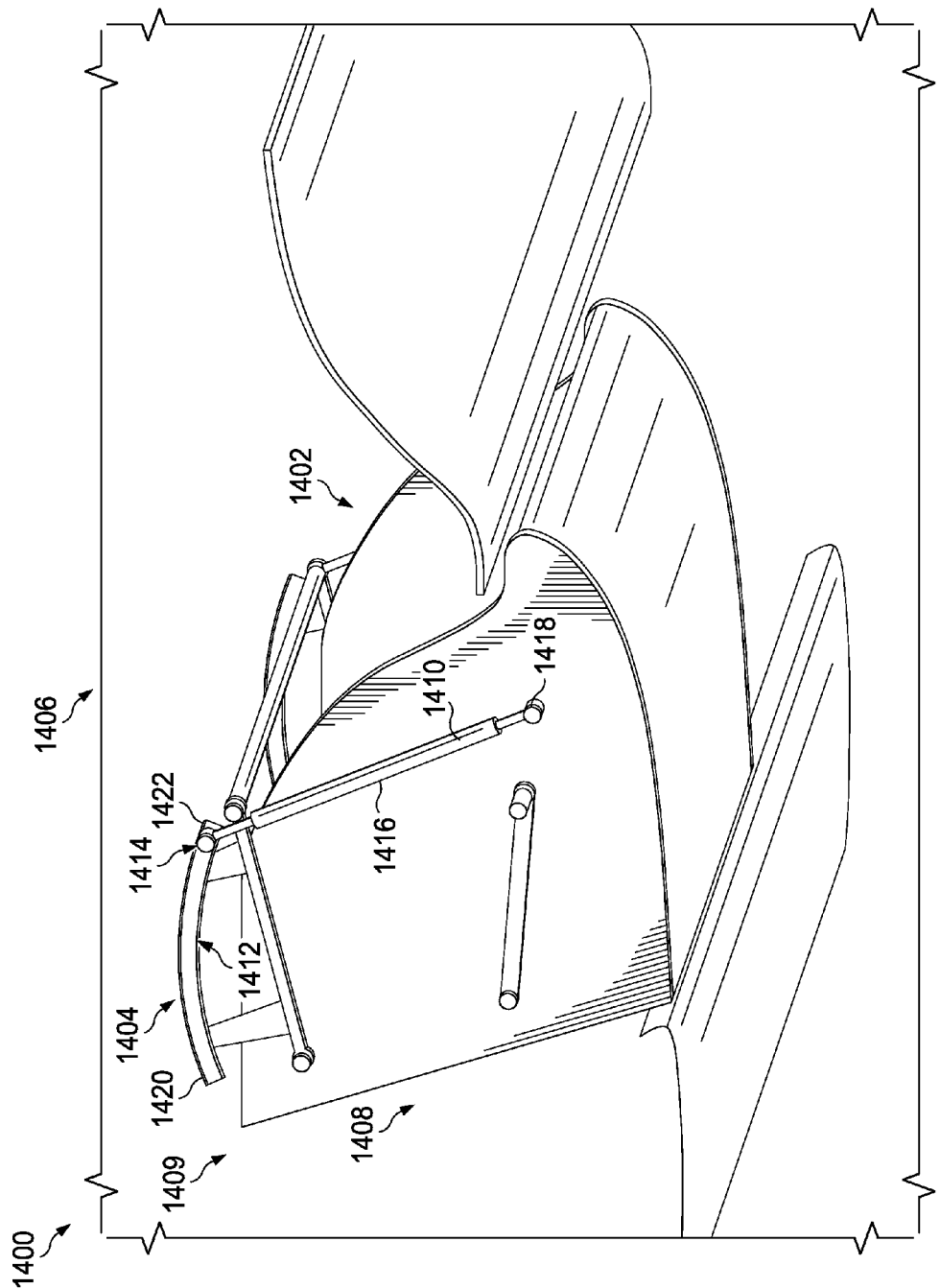
FIG. 14 an illustration of a simplified view of a yet further example of a closed stowage bin with a minimum assistive closing force in accordance with an illustrative embodiment.

Turning now to FIG. 14, an illustration of a simplified view of a yet further example of a closed stowage bin with a minimum assistive closing force is depicted in accordance with an illustrative embodiment. As depicted, stowage environment 1400 includes stowage bin 1402 and assist mechanism 1404. Stowage bin 1402 may be a physical implementation of stowage bin 206 in stowage environment 200 of FIG. 2. Stowage bin 1402 is in closed position 1406. Stowage bin 1402 is movably connected to a structure by number of pivots 1408. As depicted, number of pivots 1408 takes the form of four bar linkage 1409.

Assist mechanism 1404 includes force generation device 1410 and guide 1412. An adjustment mechanism is not depicted, but would be used to move movable end 1414 of force generation device 1410. As depicted, force generation device 1410 takes the form of compression strut 1416. Force generation device 1410 has fixed end 1418 and movable end 1414. Fixed end 1418 remains connected to an aircraft structure (not depicted). Movable end 1414 translates along guide 1412 to change a closing force supplied by assist mechanism 1404. Movable end 1414 may be moved to and maintained at various positions along guide 1412. The closing force has a value within a range of assistive closing force values. As depicted, force generation device 1410 is positioned to provide a minimum value for an assistive closing force.

In this illustrative example, guide 1412 is an arc. Guide 1412 has first end 1420 and second end 1422. When movable end 1414 is at first end 1420, the closing force has a maximum value. When movable end 1414 is at second end 1422, the closing force has a minimum value.

Although not depicted in this simplified illustration, several other components may be present in this example. For example, this embodiment may have at least one of an adjustment mechanism, controller, or number of sensors.

Figure 15:
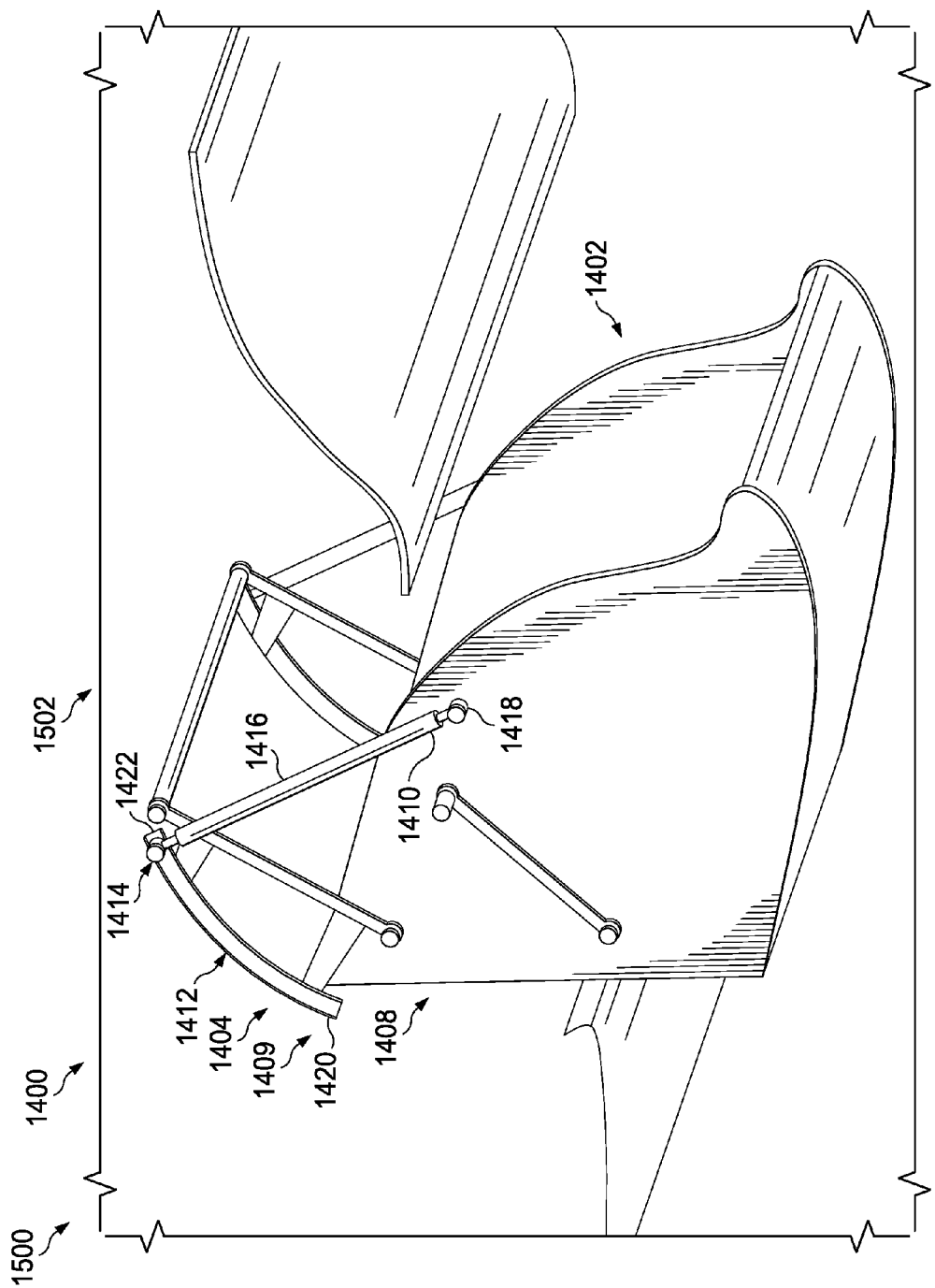
FIG. 15 is an illustration of a simplified view of a yet further example of an open stowage bin with a minimum assistive closing force in accordance with an illustrative embodiment.

Turning now to FIG. 15, an illustration of a simplified view of a yet further example of an open stowage bin with a minimum assistive closing force is depicted in accordance with an illustrative embodiment. View 1500 is a view of stowage bin 1402 in open position 1502. As depicted, adjustment mechanism (not shown) has moved movable end 1414 of force generation device 1410 to second end 1422 of guide 1412.

The illustrations of stowage bins, number of pivot points, and assist mechanisms in FIGS. 3-15 are not meant to imply physical or architectural limitations to the manner in which an illustrative embodiment may be implemented. Other components in addition to or in place of the ones illustrated may be used. Some components may be optional.

The different components shown in FIGS. 1 and 3-15 may be illustrative examples of how components shown in block form in FIG. 2 can be implemented as physical structures. Additionally, some of the components in FIGS. 1 and 3-15 may be combined with components in FIG. 2, used with components in FIG. 2, or a combination of the two.

Turning now to FIG. 16, an illustration of a flowchart of a process for providing a closing force is depicted in accordance with an illustrative embodiment. Process 1600 may be used to provide a closing force to reduce a force required to move a stowage bin from an open position to a closed position. Process 1600 may be used with stowage bin 206 of FIG. 2 to provide closing force 234. Process 1600 may also be used with any stowage bins of FIGS. 3-15 to provide a closing force.

Process 1600 begins by taking a number of measurements of a number of forces applied to a stowage bin during operation of the stowage bin, wherein the number of measurements is taken by a number of sensors (operation 1602). In some illustrative examples, the number of sensors includes a first sensor. This first sensor may measure an amount of opening force. The amount of opening force may be an amount of opening torque applied by a number of items within the stowage bin. Accordingly, taking the number of measurements of the number of forces applied to the stowage bin during operation of the stowage bin includes taking a measurement of the amount of opening torque applied to the stowage bin by a number of items within the stowage bin. This type of measurement may be referred to as a direct measurement.

In other illustrative examples, the number of sensors may include a first sensor and a second sensor. The first sensor may measure an amount of opening force applied to the stowage bin. The amount of opening force is an amount of opening torque applied by a number of items within the stowage bin and an amount of force applied to a handle of the stowage bin by a human operator. In these illustrative examples, the second sensor may take a measurement of the amount of force applied to the handle of the stowage bin by the human operator.

Process 1600 continues by comparing data from the number of sensors (operation 1604). Comparing data from the number of sensors may include comparing the data from the number of sensors taken during the same time. For example, data from the first sensor may be compared to data from the second sensor. In some illustrative examples, comparing data from the number of sensors may include comparing data from different times. For example, current measurements may be compared to past measurements to determine if a weight of a number of items within the stowage bin has changed.

Process 1600 then adjusts a closing force provided by an assist mechanism based on the data from the number of sensors (operation 1606). In some illustrative examples, the closing force provided by the assist mechanism may be changed by changing a length of a lever arm of the assist mechanism.

Process 1600 may then provide the closing force by the assist mechanism, wherein the assist mechanism has a mechanical advantage that changes to provide the closing force (operation 1608). Afterwards, the process terminates.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of module, a segment, a function, or a portion a combination thereof of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

In some illustrative examples, the process may also identify, by the controller, a value for the closing force based on the number of measurements. The value for the closing force may be identified based on at least one of the value of the opening torque, a value of the force provided by a human operator on the handle of the stowage bin, or a total force on the stowage bin. The process may further direct the adjustment mechanism to change a position of at least one structure of the assist mechanism to provide the value for the closing force. For example, a controller may direct the adjustment mechanism to move a movable end of a force generation device to provide a value for the closing force. In some illustrative examples, providing the closing force may include generating a first force by a force generation device of the assist mechanism to provide the closing force, wherein the force generation device comprises at least one of a tension spring, a compression spring, a torsion spring, a strut, a gas strut, a weight, a motor, or a magnet.

In some illustrative examples, taking the number of measurements of the number of forces applied to the stowage bin during operation of the stowage bin includes taking a measurement of the amount of opening torque applied to the stowage bin by a number of items within the stowage bin. The method may also change a length of a lever arm of the assist mechanism based on the measurement of the amount of opening torque applied to the stowage bin by the number of items, wherein the lever arm is between a point of application of the closing force by the assist mechanism and an axis of rotation. The axis of rotation may also be called a fulcrum. In some illustrative examples, the process may move the point of application of the first force of the force generation device by the adjustment system to change the length of the lever arm based on the amount of opening torque applied to the stowage bin by the number of items. In some illustrative examples, moving the point of application of the first force of the force generation device comprises guiding movement of the point of application of the first force along a path by a guide device, wherein the guide device is selected from at least one of a track, a linkage, a rail, or a groove.

In some illustrative examples, the process places a number of items into the stowage bin while the stowage bin is in the open position such that the stowage bin contains the number of items. The process may take a second number of measurements of a second number of forces applied to the stowage bin during operation of the stowage bin following placing the number of items into the stowage bin, wherein the second number of measurements is taken by the number of sensors. The process may compare data from the number of sensors related to the second number of measurements.

In some illustrative examples, the process may then adjust the closing force provided by the assist mechanism based on the data from the number of sensors related to the second number of measurements to form an increased closing force, wherein adjusting the closing force includes changing the mechanical advantage of the assist mechanism. Afterwards, the process may provide the increased closing force by the assist mechanism. Thus, the closing force may change as the number of items changes within the stowage bin.

The illustrative embodiments of the present disclosure may be described in the context of aircraft manufacturing and service method 1700 as shown in FIG. 17 and aircraft 1800 as shown in FIG. 18. Turning first to FIG. 17, an illustration of an aircraft manufacturing and service method is depicted in accordance with an illustrative embodiment. During pre-production, aircraft manufacturing and service method 1700 may include specification and design 1702 of aircraft 1800 in FIG. 18 and material procurement 1704.

During production, component and subassembly manufacturing 1706 and system integration 1708 of aircraft 1800 in FIG. 18 takes place. Thereafter, aircraft 1800 in FIG. 18 may go through certification and delivery 1710 in order to be placed in service 1712. While in service 1712 by a customer, aircraft 1800 in FIG. 18 is scheduled for routine maintenance and service 1714, which may include modification, reconfiguration, refurbishment, and other maintenance or service.

Each of the processes of aircraft manufacturing and service method 1700 may be performed or carried out by a system integrator, a third party, an operator, or a combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 18, an illustration of an aircraft is depicted in which an illustrative embodiment may be implemented. In this example, aircraft 1800 is produced by aircraft manufacturing and service method 1700 in FIG. 17 and may include airframe 1802 with plurality of systems 1804 and interior 1806. Examples of systems 1804 include one or more of propulsion system 1808, electrical system 1810, hydraulic system 1812, and environmental system 1814. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1700 in FIG. 17. In particular, stowage bin 206 and assist mechanism 208 from FIG. 2 may be used during any one of the stages of aircraft manufacturing and service method 1700. For example, without limitation, assist mechanism 208 from FIG. 2 may be used to provide closing force during at least one of component and subassembly manufacturing 1706, system integration 1708, routine maintenance and service 1714, or some other stage of aircraft manufacturing and service method 1700.

In one illustrative example, components or subassemblies produced in component and subassembly manufacturing 1706 in FIG. 17 may be fabricated or manufactured in a manner similar to components or subassemblies produced while aircraft 1800 is in service 1712 in FIG. 17. As yet another example, one or more apparatus embodiments, method embodiments, or a combination thereof may be utilized during production stages, such as component and subassembly manufacturing 1706 and system integration 1708 in FIG. 17. One or more apparatus embodiments, method embodiments, or a combination thereof may be utilized while aircraft 1800 is in service 1712, during maintenance and service 1714 in FIG. 17, or a combination thereof. The use of a number of the different illustrative embodiments may substantially expedite the assembly, reduce the cost of aircraft 1800, or both.

Thus, the illustrative embodiments provide a stowage bin having an assistive mechanism providing a closing force to reduce a force required to move the stowage bin from an open position to a closed position. The closing force may be increased or decreased along a range of values. The closing force may be increased or decreased based on a weight of a number of items within the stowage bin. The weight of the number of items may create an opening torque on the stowage bin. The opening torque may be determined based on data provided by a number of sensors. In some examples, the number of sensors may directly measure the opening torque on the stowage bin. In other examples, the number of sensors may instead indirectly measure the opening torque on the stowage bin by measuring a total force on the stowage bin.

By providing a closing force, an assist mechanism may allow for stowage bins to have increased capacity without increasing the amount of force a human operator must apply to open or close the stowage bin. By providing a closing force, an assist mechanism may allow for stowage bins to be placed higher within the cabin of an aircraft. Having stowage bins placed higher within the cabin may provide increased passenger comfort and mobility. By providing a closing force, heavier items may be placed within a stowage bin without substantially increasing the force a human operator must apply to open or close the stowage bin.

The illustrative embodiments may provide an assistive closing force without an undesirable amount of added weight. Further, the illustrative embodiments may provide an assistive closing force without power requirements of other 'solutions' such as motorized bins. The illustrative embodiments may automatically adjust to variable load conditions caused by adding or removing a number of items within the stowage bin. Further, the illustrative embodiments may provide an assistive closing force without undesirably limiting or undesirably impacting the functionality or operation of the stowage bin.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a stowage bin;
   a number of sensors that measure a number of forces on the stowage bin, wherein the number of sensors comprises a first sensor to take a measurement of an amount of opening force applied to the stowage bin, wherein the amount of opening force applied to the stowage bin comprises an amount of force applied to a handle of the stowage bin by a human operator;
   an assist mechanism that provides a closing force, wherein the assist mechanism has a mechanical advantage that changes to provide the closing force;
   a controller that compares data from the number of sensors; and
   an adjustment mechanism that adjusts the closing force based on the data from the number of sensors.

2. The apparatus of claim 1, wherein the closing force reduces a force required to move the stowage bin from an open position to a closed position, and wherein the closing force is part of a range of possible assistive closing forces.

3. The apparatus of claim 1, wherein the controller identifies the closing force based on the data from the number of sensors and directs the adjustment mechanism to change a position of at least one structure of the assist mechanism to provide the closing force.

4. The apparatus of claim 3, wherein the controller directs the adjustment mechanism to change a length of a lever arm of the assist mechanism to provide the closing force.

5. The apparatus of claim 1, wherein the amount of opening force applied to the stowage bin further comprises an amount of opening torque applied by a number of items within the stowage bin.

6. The apparatus of claim 5, wherein the number of sensors further comprises a second sensor to take the measurement of the amount of force applied to the handle of the stowage bin by the human operator.

7. The apparatus of claim 1, wherein the assist mechanism comprises:
 a force generation device that generates a first force to provide the closing force to move the stowage bin from an open position to a closed position, the force generation device comprising at least one of a tension spring, a compression spring, a torsion spring, a strut, a gas strut, a weight, a motor, or a magnet.

8. The apparatus of claim 7, wherein the number of sensors supplies the data, wherein the assist mechanism has a lever arm between a point of application of the closing force of the assist mechanism and an axis of rotation, and wherein a length of the lever arm is changed based on an amount of opening torque applied to the stowage bin by a number of items as determined based on the data from the number of sensors.

9. The apparatus of claim 8, wherein the adjustment mechanism moves a point of application of the first force by the force generation device to change the length of the lever arm based on the amount of opening torque applied to the stowage bin by the number of items.

10. The apparatus of claim 9, wherein the assist mechanism comprises:
 a guide device that guides movement of the point of application of the first force along a path, wherein the guide device is selected from at least one of a track, a linkage, a rail, or a groove.

11. The apparatus of claim 8, wherein the force generation device has a fixed end and a movable end, wherein the movable end moves along a path in an arc about the fixed end to change the length of the lever arm.

12. The apparatus of claim 8, wherein the lever arm has a first length when a first amount of opening torque is applied to the stowage bin by the number of items and a second length that is greater than the first length when a second amount of opening torque is applied to the stowage bin by the number of items, and wherein the second amount of opening torque is greater than the first amount of opening torque.

13. The apparatus of claim 8 further comprising:
 a movement inhibitor associated with a point of application of the first force by the force generation device, wherein the movement inhibitor engages to substantially prevent the length of the lever arm from changing as the stowage bin moves from the open position to the closed position.

14. The apparatus of claim 13, wherein the movement inhibitor includes at least one of a rack and pinion, a clamp, a roller cam clamp, a non-back drive actuator, a latch, or a magnetic lock.

15. The apparatus of claim 8 further comprising:
 a locking mechanism connected to the stowage bin, wherein the locking mechanism locks the stowage bin in the open position while the length of the lever arm changes.

16. A method comprising:
 taking a number of measurements of a number of forces applied to a stowage bin during operation of the stowage bin, wherein the number of measurements is taken by a number of sensors, wherein the number of sensors comprises a first sensor to take a measurement of an amount of opening force applied to the stowage bin, wherein the amount of opening force applied to the stowage bin comprises an amount of force applied to a handle of the stowage bin by a human operator;
 comparing data from the number of sensors;
 adjusting a closing force provided by an assist mechanism based on the data from the number of sensors; and
 providing the closing force by the assist mechanism, wherein the assist mechanism has a mechanical advantage that changes to provide the closing force.

17. The method of claim 16 further comprising:
 identifying, by a controller, a value for the closing force based on the number of measurements; and
 directing an adjustment mechanism to change a position of at least one structure of the assist mechanism to provide the value for the closing force.

18. The method of claim 17, wherein providing the closing force comprises:
 generating a first force by a force generation device of the assist mechanism to provide the closing force, wherein the force generation device comprises at least one of a tension spring, a compression spring, torsion spring, a strut, a gas strut, a weight, a motor, or a magnet.

19. The method of claim 18, wherein taking the number of measurements of the number of forces applied to the stowage bin during the operation of the stowage bin includes taking a measurement of an amount of opening torque applied to the stowage bin by a number of items within the stowage bin, and the method further comprising:
 changing a length of a lever arm of the assist mechanism based on the measurement of the amount of opening torque applied to the stowage bin by the number of items, wherein the lever arm is between a point of application of the closing force by the assist mechanism and an axis of rotation.

20. The method of claim 19 further comprising:
 moving a point of application of the first force of the force generation device by an adjustment system to change the length of the lever arm based on the amount of opening torque applied to the stowage bin by the number of items.

21. The method of claim 20, wherein moving the point of application of the first force of the force generation device comprises guiding movement of the point of application of the first force along a path by a guide device, wherein the guide device is selected from at least one of a track, a linkage, a rail, or a groove.

22. The method of claim 17 further comprising:
 placing a number of items into the stowage bin while the stowage bin is in an open position such that the stowage bin contains the number of items;
 taking a second number of measurements of a second number of forces applied to the stowage bin during the operation of the stowage bin following placing the number of items into the stowage bin, wherein the second number of measurements is taken by the number of sensors;
 comparing data from the number of sensors related to the second number of measurements;
 adjusting the closing force provided by the assist mechanism based on the data from the number of sensors related to the second number of measurements to form an increased closing force, wherein adjusting the closing force includes changing the mechanical advantage of the assist mechanism; and providing the increased closing force by the assist mechanism.

23. An apparatus comprising:

a stowage bin;

a pivot directly connected to the stowage bin and a structure such that the stowage bin may rotate about the pivot from an open position to a closed position;

a number of sensors that measure a number of forces on the stowage bin, wherein the number of sensors comprises a first sensor to take a measurement of an amount of opening force applied to the stowage bin, wherein the amount of opening force applied to the stowage bin comprises an amount of force applied to a handle of the stowage bin by a human operator; and an assist mechanism that provides a closing force, wherein the assist mechanism has a mechanical advantage that changes to provide the closing force.

* * * * *